(12) United States Patent
Stork Genannt Wersborg et al.

(10) Patent No.: US 9,802,271 B2
(45) Date of Patent: Oct. 31, 2017

(54) LASER MATERIAL PROCESSING SYSTEM

(75) Inventors: Ingo Stork Genannt Wersborg, Munich (DE); Frederik Born, Munich (DE)

(73) Assignees: PRECITEC GMBH & CO. KG, Gaggenau-Bad Rotenfels (DE); PRECITEC ITM GMBH & CO. KG, Eschborn (DE)

( * ) Notice: Subject to any disclaimer, the term of this patent is extended or adjusted under 35 U.S.C. 154(b) by 400 days.

(21) Appl. No.: 14/117,564

(22) PCT Filed: May 14, 2012

(86) PCT No.: PCT/EP2012/002062
§ 371 (c)(1),
(2), (4) Date: Feb. 10, 2014

(87) PCT Pub. No.: WO2012/156071
PCT Pub. Date: Nov. 22, 2012

(65) Prior Publication Data
US 2014/0144895 A1 May 29, 2014

(30) Foreign Application Priority Data
May 13, 2011 (EP) .................................. 11003992

(51) Int. Cl.
B23K 26/08 (2014.01)
B23K 26/046 (2014.01)
(Continued)

(52) U.S. Cl.
CPC ............ B23K 26/08 (2013.01); B23K 26/032 (2013.01); B23K 26/042 (2015.10);
(Continued)

(58) Field of Classification Search
CPC ........ B23K 26/00; B23K 26/04; B23K 26/06; B23K 26/08; B23K 26/10; B23K 26/20;
(Continued)

(56) References Cited

U.S. PATENT DOCUMENTS 4,960,970 A * 10/1990 Schneiter ............... B23K 26/03
219/121.6
6,188,078 B1 * 2/2001 Bell, Jr. .................. G02B 7/003
250/216

(Continued)

FOREIGN PATENT DOCUMENTS

DE          100 61 644 A1      6/2002
DE     10 2007 035485 A1      1/2009
(Continued)

OTHER PUBLICATIONS

DE 102007035485 Machine Translation—performed: Jan. 21, 2016.*

*Primary Examiner* — Brian Jennison
(74) *Attorney, Agent, or Firm* — Muncy, Geissler, Olds & Lowe, P.C.

(57) ABSTRACT

The present invention relates to a laser material processing system for processing a workpiece by means of a laser beam, comprising an optical system having at least one optical component for focusing the laser beam to form a focal point on the workpiece or in a defined position relative to the workpiece, at least one inertial sensor for detecting a transitional and/or rotational acceleration of the at least one optical component of the optical system and/or the workpiece, and a processing unit connected to the at least one inertial sensor for determining a relative transitional and/or rotational acceleration between the focal point and the workpiece.

14 Claims, 14 Drawing Sheets

(51) Int. Cl.
*B23K 26/06* (2014.01)
*B23K 26/38* (2014.01)
*B23K 26/03* (2006.01)
*B23K 26/042* (2014.01)
*B23K 26/24* (2014.01)

(52) U.S. Cl.
CPC ........ *B23K 26/046* (2013.01); *B23K 26/0648* (2013.01); *B23K 26/083* (2013.01); *B23K 26/24* (2013.01); *B23K 26/38* (2013.01)

(58) Field of Classification Search
CPC .. B23K 26/38; B23K 26/041; B23K 26/0648; B23K 26/032
See application file for complete search history.

(56) References Cited

U.S. PATENT DOCUMENTS

| | | | | |
|---|---|---|---|---|
| RE38,817 E | * | 10/2005 | Slettnes | G01N 27/44721 |
| | | | | 204/612 |
| 2006/0043078 A1 | * | 3/2006 | Bernges | B23K 26/032 |
| | | | | 219/121.83 |

FOREIGN PATENT DOCUMENTS

| | | |
|---|---|---|
| JP | H 09122948 A | 5/1997 |
| JP | 2008-000801 A | 1/2008 |

\* cited by examiner

LASER MATERIAL PROCESSING SYSTEM

The present invention relates to a laser material processing system for processing a workpiece by means of a laser beam and to a method for processing a workpiece by means of a laser material processing system.

In laser material processing, workpieces are cut or joined by means of focused laser radiation, process monitoring systems and sensors being used both for a laser cutting operation and for a laser welding operation. By way of example, sensors for detecting the radiation coming from a work or interaction zone determined by the working focus are used for monitoring the welding or cutting process. Provided in this context as standard are radiation sensors for observing plasma forming over the interaction zone, and a back reflection sensor that detects the back reflection radiation of the laser from the interaction zone between the laser beam and the workpiece to be processed. Furthermore, in order to monitor the laser processing operation use is made of temperature sensors or infrared sensors that can be used to monitor edge melting and the temperature profile during processing. In addition to the use of photodiodes that are sensitive in each case to a specific wavelength range, the laser processing operation is, furthermore, monitored via cameras that can likewise be sensitive in predetermined wavelength ranges. Characteristics for monitoring the laser processing operation, such as, for example, parameters regarding the melted workpiece can likewise be obtained on the basis of image processing of the images recorded by the cameras.

In present day industrial systems, the sensors and cameras used for process monitoring are applied to perform a classification of the current state of the processing operation with the aid of the detected sensor data and of methods for image processing and data analysis.

Important parameters for the processing quality are laser power, processing speed and material thickness. Optical flow methods have been developed to estimate motion during laser material processing by searching for changes of brightness pattern in alternating camera frames. Horn and Schunck "Determining optical flow", Artificial Intelligences, Vol. 17, No. 1 to 3, pages 185 to 203, 1981 discloses an optical flow method, wherein it is argued that the optical flow cannot be computed locally, since only one independent measurement is available from the sequence at a point. Since a velocity vector in the image plane has two components, an additional constraint is needed. The constraint is proposed to be the assumption that the apparent velocity of the brightness pattern varies smoothly almost everywhere in the image. Since the only changes to the workpiece, other than movement, are introduced by the laser melting the material, this constraint should hold for large areas of the video frames.

However, the Horn and Schunck method requires a high computational complexity. Considering frame rates of 1000 frames per second for welding, or even more for the fast processing velocities used in laser cutting applications, this algorithm is not fast enough.

Further, the implementation of the Horn-Schunck method is also difficult. Conventional cameras applying a FPGA (Field Programmable Gate Array) are normally working to full capacity with dimensionality reduction and feature extraction methods. Calculating the optical flow on a workstation is also no option, because the frames can't be transferred to the computer in real time.

Furthermore, optical flow usually performs worse on object boundaries. Thus, the, e.g., weld seam needs to be removed from the video frames to improve the algorithm. However, this would further increase the computational complexity and lead to a loss of information about the weld seam.

DE 100 61 644 A1 describes a method for laser welding, wherein the position of an object to be welded is detected by means of a control unit, and wherein a laser beam is directed by means of a tilted plane mirror to a desired position on the object. Herein, the movement of the object is detected by means of a laser length-measuring sensor or an incremental encoder, and the control unit is adapted to determine a correction value for the direction of the laser beam or to control the laser power in accordance with the detected movement.

It is an object of the present invention to provide a laser material processing system for processing a workpiece by means of a laser beam and a method thereof, wherein the processing quality can be improved.

This object is achieved by the laser material processing system for processing a workpiece by means of a laser beam according to claim 1 and by the method for processing a workpiece according to claim 16. Advantageous configurations of the invention are set out in the dependent claims.

In particular, the object is achieved by the virtue of the fact that a relative transitional and/or rotational acceleration between the focal point and the workpiece is determined by means of an inertial sensor. Moreover, on the basis of the relative transitional and/or rotational acceleration, an actual relative velocity and/or an actual relative position between the focal point and the workpiece can be calculated.

Although, the present invention will be described in relation with a laser material processing system, it should be acknowledged that the present invention is not limited to laser material processing systems, but can also be used for other kinds of Material Processing systems, such as a conventional welding torch system or adhesive bead system.

A first advantage of the laser material processing system of the present invention is initially to classify the processing quality in accordance with the process specification on the basis of acceleration data. A second advantage is to improve the processing quality by controlling and closed-loop controlling the processes on the basis of acceleration data.

According to the present invention, a laser material processing system for processing a workpiece by means of a laser beam comprises an optical system with at least one optical component. By means of the optical system the laser beam is focused to form a focal point on the workpiece or in defined position relative to the workpiece. Further, at least one inertial sensor for detecting a transitional and/or rotational acceleration of the at least one optical component of the optical system and/or the workpiece is mounted in a fixed state relative to the at least one optical component of the optical system and/or the workpiece. A processing unit is connected to the at least one inertial sensor for determining a relative transitional and/or rotational acceleration between the focal point and the workpiece.

Preferably, the processing unit comprises a real-time clock and is adapted to calculate an actual velocity and/or an actual or relative position between the focal point and the workpiece based on the detected transitional and/or rotational acceleration. Therefore, the processing unit is adapted to integrate the determined relative transitional and/or rotational acceleration over time steps provided by the real-time clock under consideration of a respective initial relative velocity $v_0$ and/or a respective initial relative position $x_0$. By aid of the real-time clock, the processing unit can be provided with high accuracy time-stamps leading to a reduced error in the integration process.

Preferably, the laser material processing system further comprises an actuator system for adjusting a relative position between the focal point and the workpiece by positioning the at least one optical component and/or the workpiece. By aid of the actuator system, it is possible to perform very precise movements that can be detected by the at least one inertial sensor.

Preferably, the processing unit is further adapted to control the actuator system in such a way, that the actuator system can regulate an actual relative position between the focal point and the workpiece to a given set-point, i.e. a set relative position, by positioning the at least one optical component and/or the workpiece taking into account the calculated actual relative position between the focal point and the workpiece. By regulating the actual relative position between the focal point and the workpiece to the given set-point, it is possible to obtain a laser cut or seam having a smooth curvature.

Preferably, the laser material processing system comprises at least two inertial sensors that are fixed to one optical component of the optical system and/or the workpiece. Herein, the processing unit can be adapted to correlate the acceleration data from the at least two inertial sensors, such as to calculate a mean transitional and/or rotational acceleration.

In particular, given the condition that certain components of the laser material processing system are moveable, it is preferred that at least one inertial sensor is fixed to each moveable component to detect the movement of all moveable components simultaneously, and to correlate the acceleration data from all inertial sensors.

Preferably, the at least one inertial sensor is fixed to the workpiece. This may represent a very simple modification of an existing laser material processing system, wherein the existing laser material processing system can be adapted to obtain the advantageous features of the present invention by the provision of a processing unit and an inertial sensor that is detachable fixed to the workpiece in an area that will not be processed by means of the laser beam.

Preferably, the laser material processing system further comprises a moveable table for holding the workpiece on a holding part thereof and the at least one inertial sensor is fixed or mounted fixedly to the holding part of the moveable table. Thereby, the workpieces can be easily exchanged. Further, this configuration is particularly preferred, if the optical system, i.e. the position of the focal point, is stationary.

Preferably, the laser material processing system further comprises a laser processing head having a casing for accommodating the optical system. Here, the at least one inertial sensor may be mounted or fixed to the casing of the laser processing head. This may represent a simple configuration providing a high exchange rate of workpieces and is particularly preferred, if the workpiece is stationary and the laser processing head is moveable.

Preferably, the optical system comprises a focusing lens for focusing the laser beam on the workpiece or to a defined position relative to the workpiece. Further, the at least one inertial sensor may be mounted or fixed in a fixed position relative to the focusing lens.

If the at least one inertial sensor is mounted or fixed in a fixed position relative to the workpiece the at least one inertial sensor is subjected to basically the same movements as the focal point, as the position of the focal point is defined by the position of the focusing lens. Hence, they are subjected to basically the same transitional and/or rotational accelerations providing the opportunity to link the position of the focal point with the position of the at least one inertial sensor.

Preferably, the optical system further comprises an optical fiber and a collimator optical unit. The collimator optical unit may serve for collimating the laser beam emitted from the optical fiber and the at least one inertial sensor may be mounted in a fixed position relative to the collimator optical unit.

Preferably, the optical system comprises at least one plane mirror or focusing mirror, to which the at least one inertial sensor is fixedly mounted. In the case that the at least one plane mirror or focusing mirror is rotatably provided in the optical system, the at least one inertial sensor may be particularly an gyroscope or yaw rate sensor to detect the rotational acceleration of the at least one plane mirror or focusing mirror. Herein, the processing unit may be adapted to calculate the acceleration of the focal point on or relative to the workpiece due to the rotation of the at least one plane mirror or focusing mirror.

Preferably, the laser material processing system further comprises a camera and an illumination device. The camera may comprise an imaging optical unit that is arranged upstream thereof in a beam path of the laser and serves to observe a processing region of the workpiece, which is processed by means of the laser beam. Further, the light from the illumination device may be coaxially coupled into the beam path of the laser beam by means of a beam splitter in order to illuminate the processing region of the workpiece. Furthermore, the processing unit may be adapted to process the image data of the camera by using the calculated actual relative velocity and the calculated actual relative position between the focal point and the workpiece for compensating a mismatch of position and orientation of a laser processing area in a plurality of image frames.

By compensating the mismatch of position and orientation of the laser processing area in the plurality of image frames, i.e. by aligning the position and orientation of the interaction zone, the analysis of the plurality of images frames can be facilitated.

Preferably, the processing unit is adapted to classify the laser processing process on the basis of feature values derived from the data from at least one sensor that comprises a camera, an air borne acoustic sensor or a solid borne acoustic sensor, or a photo diode sensor for wavelength ranges in the infrared, visible and/or ultraviolet range. Here, the calculated actual velocity may be further used for a classification result as a feature value.

Firstly, correlating distinct points on the workpiece with sensor data is difficult for a user or a human expert, if stages of acceleration and deceleration between workpiece scans and plotted process data are not compensated, in particular at the beginning and at the end of each welding or cutting process and during directional changes during the laser material process. Displaying the sensor data with respect to its estimated position on the workpiece eliminates these distortions. Thus, the addition of a velocity feature should help to improve the supervision of the welding or cutting process or of the cognitive system and help the user to correlate process data with workpiece scans.

Secondly, the laser power needed to achieve good quality cuts or welds is linearly dependent on both material thickness and processing speed. Thus, the process quality achieved by the control system should improve, if velocity is added as input to the classifier.

Thirdly, up to now, the only way to influence the behavior of the cognitive laser material processing system is to add new sensor data to training data set and recalibrate the classifier. The online estimation of the tool center point, i.e. position of the focal point, on the workpiece presented herein enables an alternative method. A set-point can be defined along the laser position on the workpiece. If the set-point deviates from zero, the system will apply more or less laser power, than it usually would have. Thus, the expert or user can adjust the process intuitively, independent of the processing speed.

Preferably, the processing unit may be adapted to control the current laser power of the laser beam in accordance with the calculated relative actual velocity and/or the calculated actual relative position between the focal point and the workpiece.

The required laser power to obtain a constant quality laser process, i.e. a laser cut or laser weld, is almost linearly dependent on the processing speed, i.e. the relative velocity between the focal point and the workpiece. A feedback of the actual processing speed for controlling the actual laser power would, therefore, help to ensure a lasers cut or laser weld of constant quality. Further, by adapting the laser power not only to the processing speed but also to the calculated actual relative position between the focal point and the workpiece, it is possible to take other variable material parameters into account, such as an altering material thickness.

According to the present invention, a method for processing a workpiece by means of a laser material processing system comprises the following steps. A laser beam is focused in order to form a focal point on the workpiece or in a defined position relative to the workpiece by means of the optical system having at least one optical component. A transitional and/or rotational acceleration of the at least one optical component of the optical system and/or the workpiece is detected by means of at least one inertial sensor. A relative transitional and/or rational acceleration between the focal point and the workpiece is determined by means of a processing unit connected to the at least one inertial sensor.

The invention is explained in more detail below by way of example with the aid of the drawings, in which.

Figure 4A:
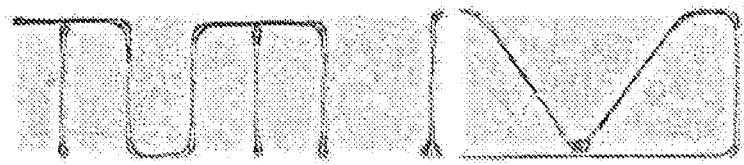
Figure 4B:
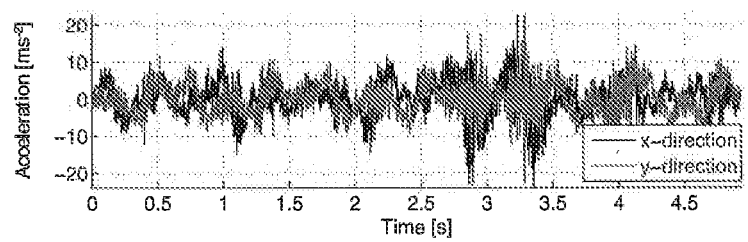
Figure 4C:
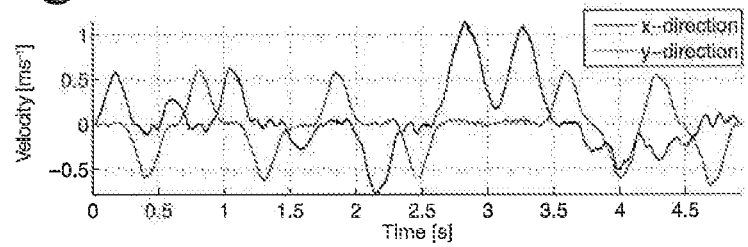
Figure 4D:
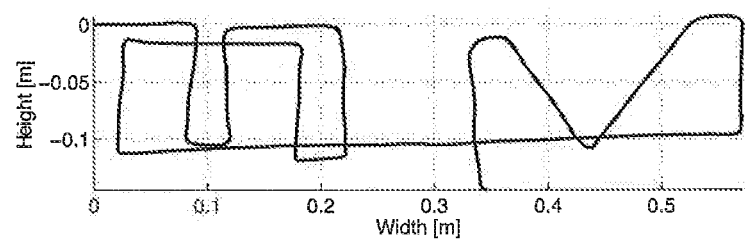
Figure 5A:
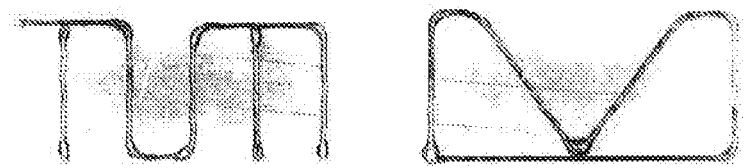
Figure 5B:
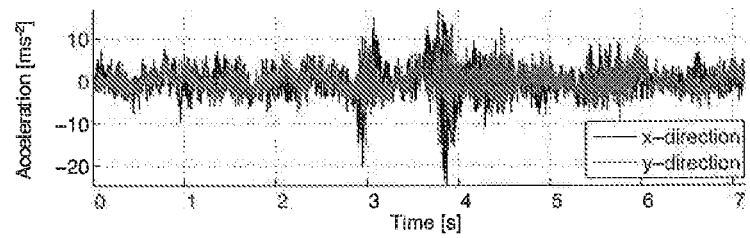
Figure 5C:
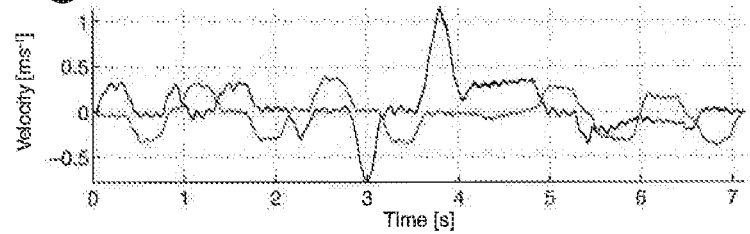
Figure 5D:
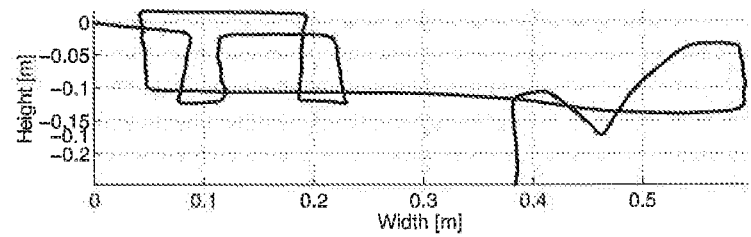
Figure 6A:
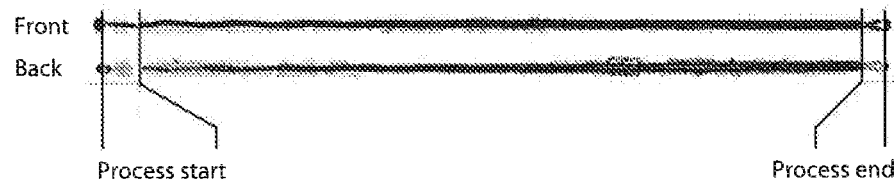
Figure 6B:
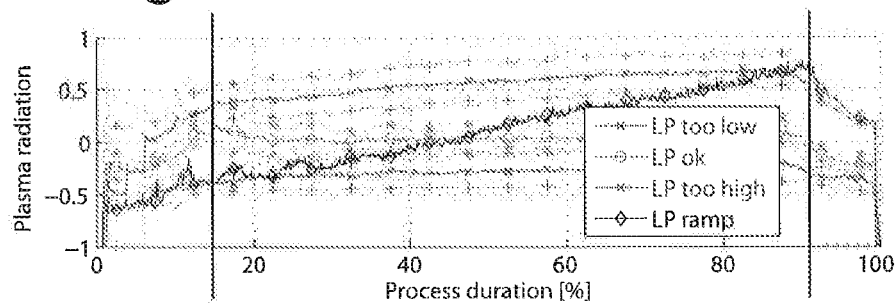
Figure 6C:
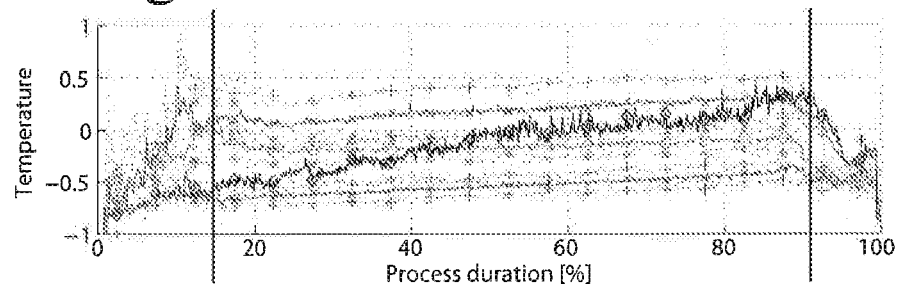
Figure 6D:
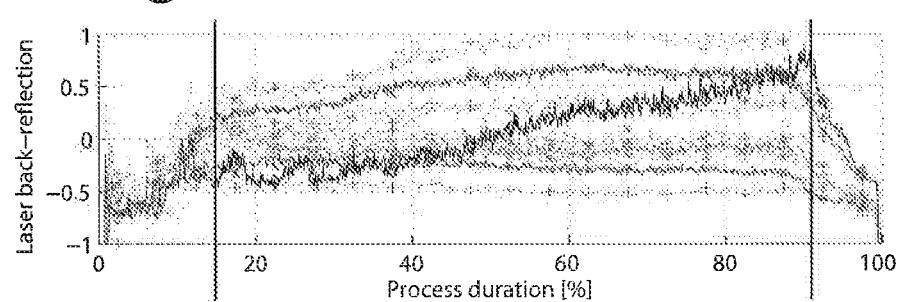
Figure 7A:
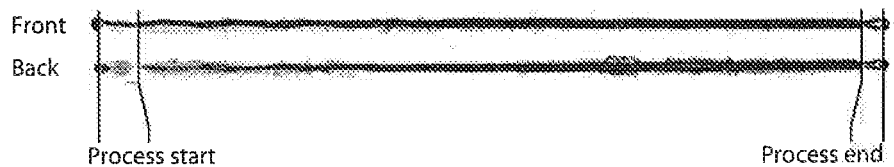
Figure 7B:
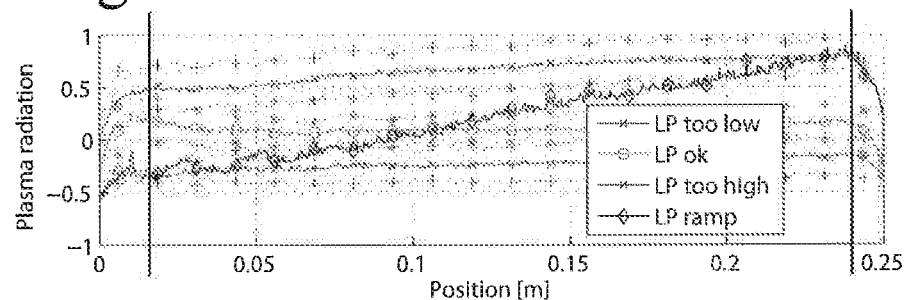
Figure 7C:
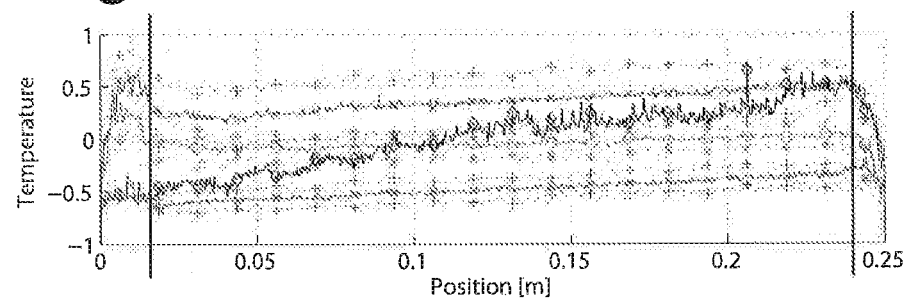
Figure 7D:
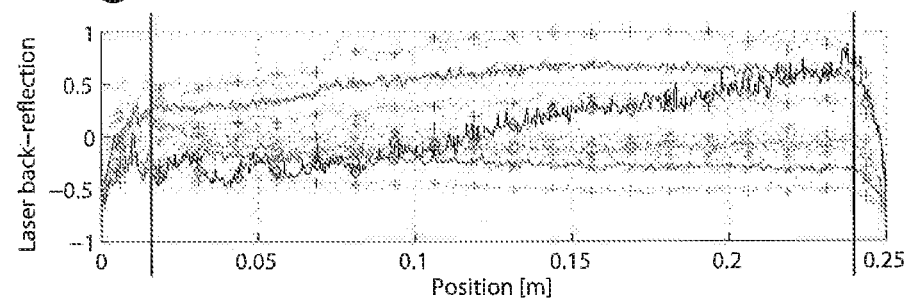
Figure 8A:
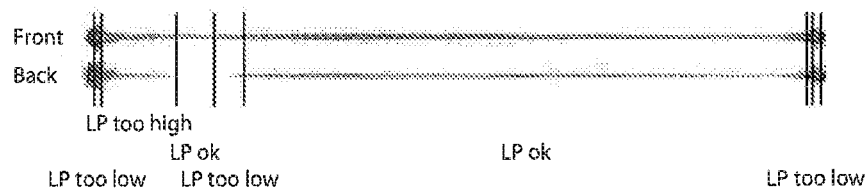
Figure 8B:
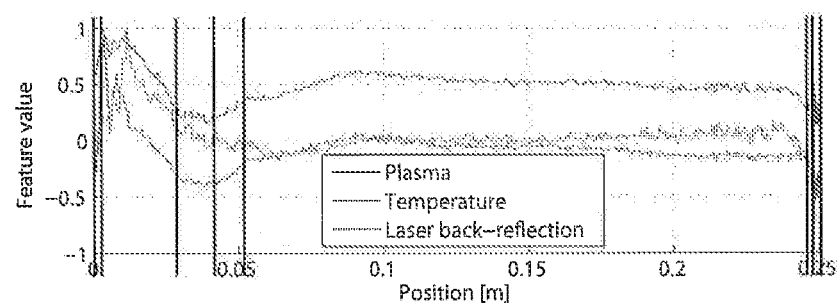
Figure 8C:
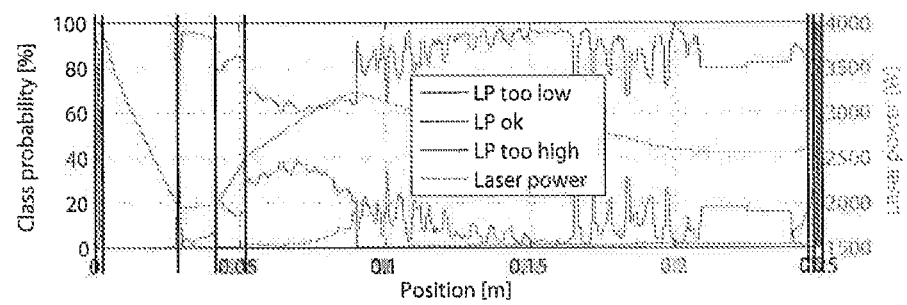
Figure 9A:
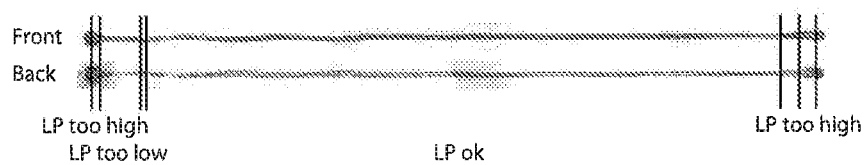
Figure 9B:
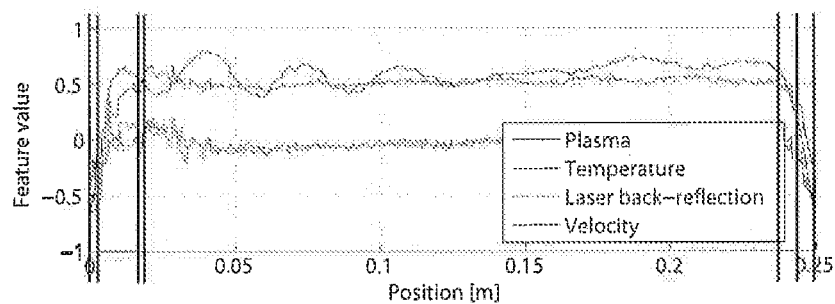
Figure 9C:
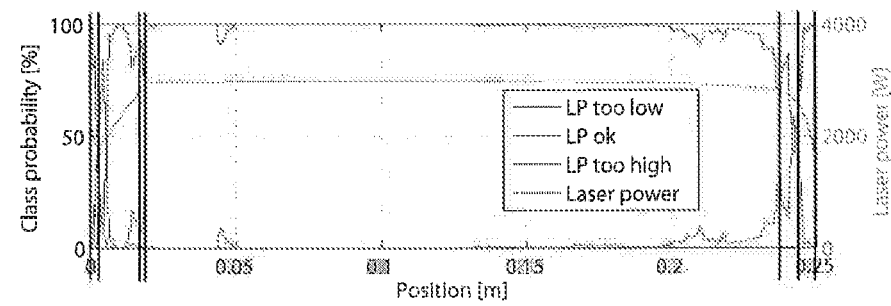
Figure 10A:
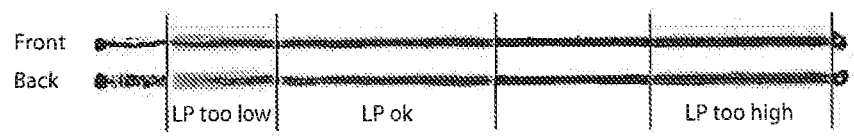
Figure 10B:
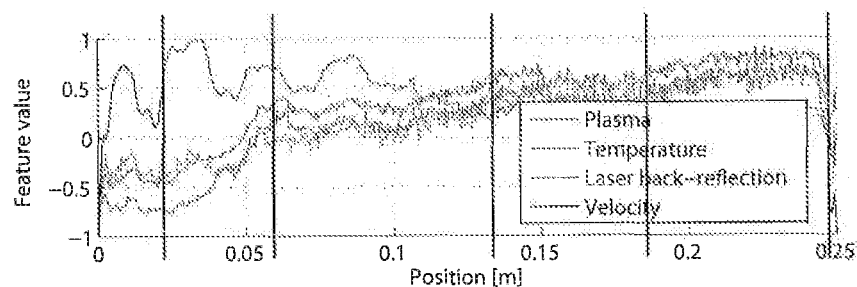
Figure 10C:
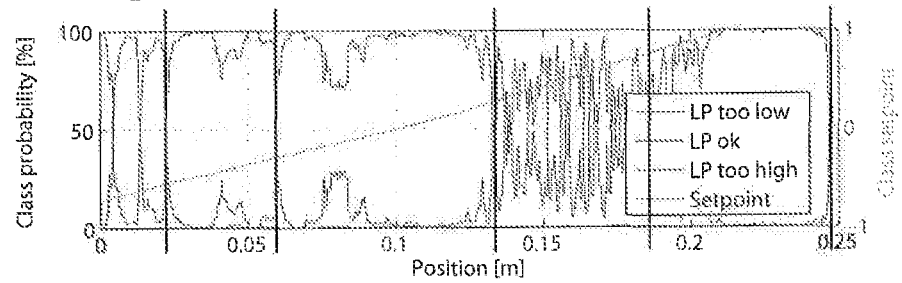
Figure 10D:
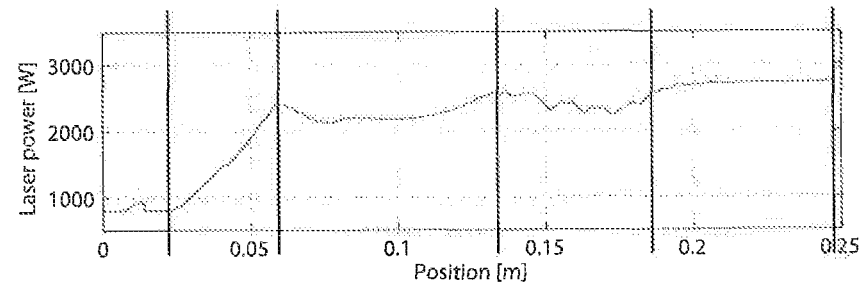
Figure 11A:
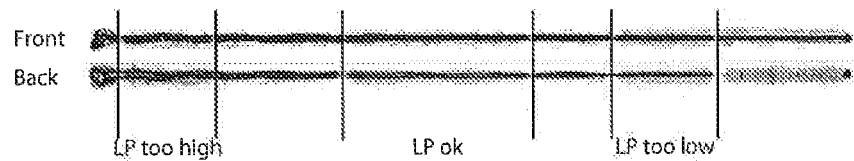
Figure 11B:
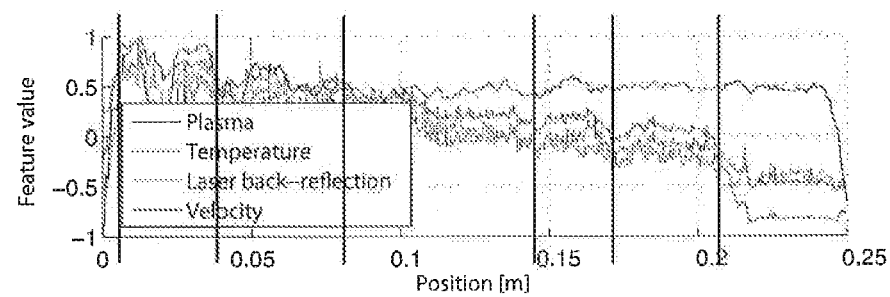
Figure 11C:
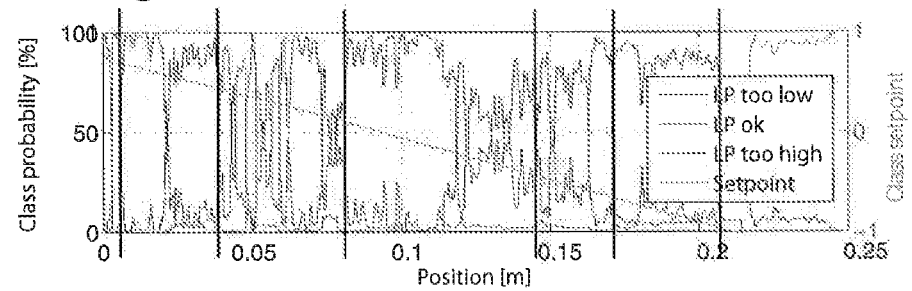
Figure 11D:
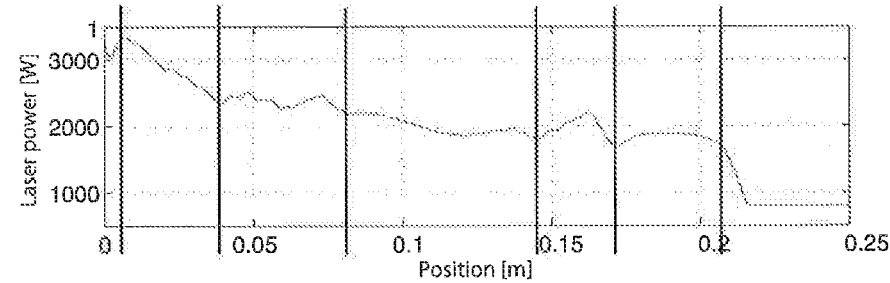
Figure 12:
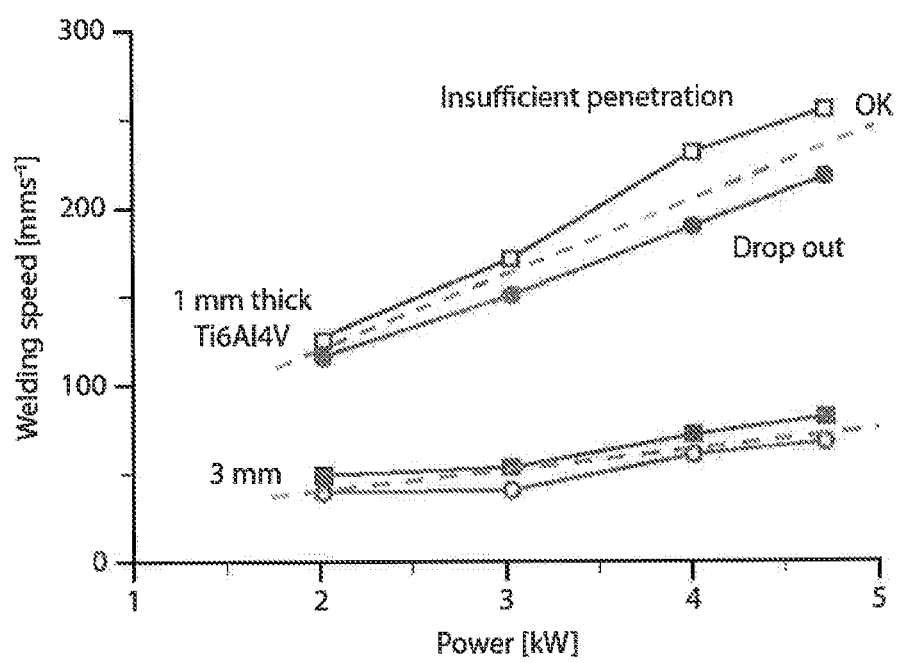

FIG. 4A shows a top view of a weld seam processed at high processing speed with a laser material processing system according to an embodiment of the present invention; FIG. 4B shows a plot of acceleration data as detected during the Laser Material process of FIG. 4A; FIG. 4C shows a plot of the calculated velocity from the acceleration data of FIG. 4B; FIG. 4D shows a 2D-plot of the calculated position from the calculated velocity of FIG. 4C;

FIG. 5A shows a top view of a weld seam processed at low processing speed with a laser material processing system according to an embodiment of the present invention; FIG. 5B shows a plot of acceleration data as detected during the Laser Material process of FIG. 5A; FIG. 5C shows a plot of the calculated velocity from the acceleration data of FIG. 5B; FIG. 5D shows a 2D-plot of the calculated position from the calculated velocity of FIG. 5C;

FIG. 6A shows a top and a bottom view of a weld seam processed with a Laser Material system; FIG. 6B shows a plot of plasma radiation versus process duration as detected during the Laser Material process of FIG. 6A; FIG. 6C shows a plot of temperature radiation versus process duration as detected during the Laser Material process of FIG. 6A; FIG. 6D shows a plot of Laser back-reflection versus process duration as detected during the Laser Material process of FIG. 6A;

FIG. 7A shows a top and a bottom view of a weld seam processed with a Laser Material system according to the present invention; FIG. 7B shows a plot of plasma radiation versus position as detected during the Laser Material process of FIG. 7A; FIG. 7C shows a plot of temperature radiation versus position as detected during the Laser Material process of FIG. 7A; FIG. 7D shows a plot of Laser back-reflection versus position as detected during the Laser Material process of FIG. 7A;

FIG. 8A shows a top and a bottom view of a weld seam processed with a Laser Material system having a closed-loop quality control; FIG. 8B shows a plot of feature value versus position as detected during the Laser Material process of FIG. 8A; FIG. 8C shows a plot of class probability and Laser power, respectively, versus position as determined during the Laser Material process of FIG. 8A;

FIG. 9A shows a top and a bottom view of a weld seam processed with a Laser Material system having a closed-loop quality control according to an embodiment of the present invention; FIG. 9B shows a plot of feature value versus position as detected during the Laser Material process of FIG. 9A; FIG. 9C shows a plot of class probability and Laser power, respectively, versus position as determined during the Laser Material process of FIG. 9A;

FIG. 10A shows a top and a bottom view of a weld seam processed with a Laser Material system having a classifier according to an embodiment of the present invention; FIG. 10B shows a plot of feature value versus position as detected during the Laser Material process of FIG. 10A; FIG. 10C shows a plot of class probability versus position as determined during the Laser Material process of FIG. 10A; FIG. 10D shows a plot of laser power versus position as regulated during the Laser Material process of FIG. 10A;

FIG. 11A shows a top and a bottom view of a weld seam processed with a Laser Material system having a classifier according to an embodiment of the present invention; FIG. 11B shows a plot of feature value versus position as detected during the Laser Material process of FIG. 11A; FIG. 11C shows a plot of class probability versus position as determined during the Laser Material process of FIG. 11A; FIG. 11D shows a plot of laser power versus position as regulated during the Laser Material process of FIG. 11A; and FIG. 12 shows a plot of welding speed versus Laser power.

Mutually corresponding components are provided in the various figures of the drawings with the same reference signs.

In accordance with the invention, a laser material processing system is provided that has an inertial sensor for sensing a transitional and/or rotational acceleration between a focal point and a workpiece.

A laser material processing system, wherein the acceleration between the focal point and the workpiece is an easy accessible variable, offers several advantages. For example, having the acceleration between the focal point and the workpiece directly measured by means of at least one inertial sensor, it is possible to integrate over the sensor data one or more times to calculate the velocity and the relative position between the focal point and the workpiece. In laser material processing, velocity is a very important parameter, in particular, as the required laser power is substantially linearly dependent on the velocity.

Moreover, the knowledge about the actual relative position of the focal point provides not only information about a deviation between the actual relative position and the set relative position but also enables the system to adept on imperfections, such as a deviation in height, of the workpiece. Besides, having the acceleration, velocity, and/or position as an easy accessible variable of the system, it is possible to plot sensor data representing information about the state of the process versus the relative position rather than the processing time or duration. Thus, the stages of acceleration, that typically appear during start, end during directional changes of a laser material, can be compensated providing an intuitive representation of the sensor data.

According to the present invention, a laser material processing system is a system for processing a workpiece 10 by means of a laser beam 12. Herein, the laser beam 12 of a laser source 14 is guided by means of an optical system 16 to the workpiece 10 and is focused by means of at least one optical component of the optical system 16, to form a focal point 18 on the workpiece 10 in an interaction zone 64, as indicated by the optical axis L, in order to carry out a laser material process, such as laser cutting, laser welding, powder coating or the like. Alternatively, the focal point 18 can be formed in a defined position relative to the workpiece 10. The laser beam can be collimated by a collimator optical unit 22, particularly in the case that the laser beam 12 is delivered to the optical system 16 by means of an optical fiber 20.

Further, the laser material processing system comprises at least one inertial sensor 24. The inertial sensor 24 may be an acceleration sensor or a yaw rate sensor and may serve to detect a transitional and/or rotational acceleration between the at least one optical component of the optical system 16 (and, hence, the focal point 18), and the workpiece 10. The inertial sensors 24 measure a specific force, e.g. gravitation, and/or angular acceleration without an external reference. Therefore, no reference in the environment, such as a texturized surface for the optical flow method, is necessary for the measurement of the acceleration. The at least on inertial sensor 24 is preferably fixed relative to an optical component of the optical system 16 or the workpiece 10, so that the at least on inertial sensor 24 is subjected to basically the same acceleration as the optical component of the optical system 16 or the workpiece 10. Preferably, the at least one inertial sensor measures an acceleration in the range from $$-50 \tfrac{m}{s^2} \text{ to } 50 \tfrac{m}{s^2},$$

more preferably in the range from $$-25 \tfrac{m}{s^2} \text{ to } 25 \tfrac{m}{s^2}.$$

The data from the at least one inertial sensor is sampled at a rate of about 500 Hz, more preferably at a rate of about 1 kHz.

Figure 1:
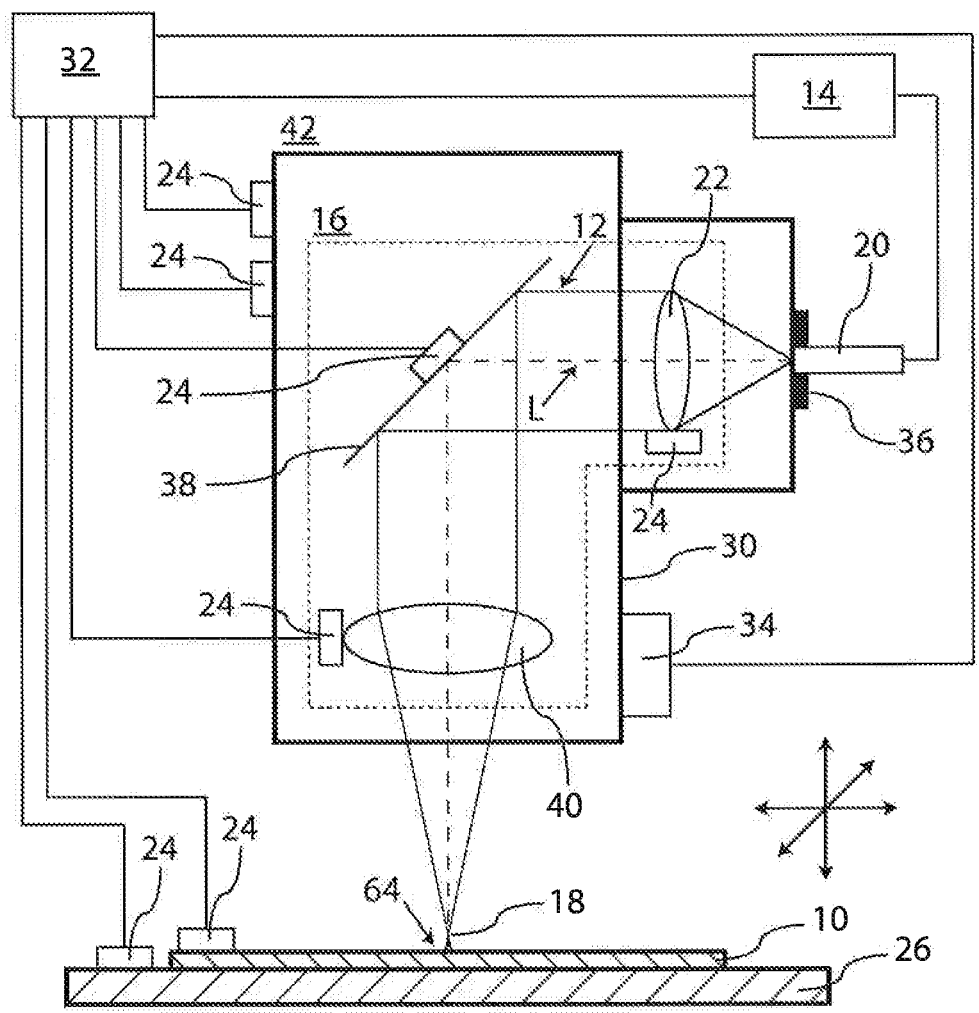
FIG. 1 shows a simplified schematic view of a laser material processing system according to an embodiment of the present invention.

In FIG. 1, several inertial sensors 24 are shown that are fixed, e.g. to the workpiece 10, the moveable table 26, to various components of the optical system 16, such as the collimator optical unit 22, and to a casing 30 that accommodates the optical system 16. However, the laser material processing system according to the present invention is not limited to the case of a plurality of inertial sensors 24. Only one inertial sensor 24 may be provided as well. Preferably, at least one inertial sensor 24 is fixed to each part of the laser material processing system, which's movement influences the relative acceleration and/or position between the focal point 18 and the workpiece 10.

A processing unit 32 is connected to the at least one inertial sensor 24 to determine a relative transitional and/or rotational acceleration between the focal point 18 and the workpiece 10.

Herein, the processing unit 32 receives sensor data from the at least one inertial sensor 24 and is adapted to determine the relative transitional and/or rotational acceleration between the focal point 18 and the workpiece 10. Preferably, the processing unit 32 comprises a real-time clock for real-time time measuring. Having a real-time clock, the processing unit 32 can allocate a real-time timestamp to each individual sensor data point. Therefore, the processing unit 32 can be adapted to calculate an actual velocity an/or an actual relative position between the focal point 18 and the workpiece 10 on the basis of the detected transitional and/or rotational acceleration. By integrating the detected transitional and/or rotational acceleration data over time taking into account the allocated timestamps it is possible to calculate the increment of the velocity and/or position during the actual time step. Thereby, the processing unit 32 and can calculate the actual velocity and/or actual relative position under consideration of a respective initial velocity $v_0$ and/or respective initial relative position $x_0$.

Having a real-time clock provided in the processing unit 32 or hosted in each inertial sensor 24 is advantageous in that it serves to reduce the overall failure of the calculated relative position and/or velocity by providing the system with accurate timestamps or performing an accurate time measurement for the integration to obtain the velocity and position.

The laser material processing system may further comprise an actuator system 34 for adjusting a relative position between the focal point 18 and the workpiece 10 by positioning optical components of the optical system 16, the optical system as such and/or the workpiece 10. Preferably, at least one inertial sensor 24 is fixed or mounted to the component that is actuated by the actuator system 34. If the actuator system 34 can adjust the position of more than one component of the laser material processing system, it is preferred that at least one inertial sensor 24 is mounted or fixed to each moveable component, i.e. the components actuated by the actuator system 34, to detect the transitional and/or rotational acceleration of each moveable component and, therefore, between the focal point 18 and the workpiece 10. Thus, it is possible to detect the transitional and/or rotational acceleration of the whole laser material processing system.

Normally, the agitation of the actuator system 34 is set before the start of the Laser Material Process and the actuator system 34 performs a predetermined motion sequence. However, according to the present invention, it is possible to adapt the processing unit 32 in such a way that it can control the actuator system 34 to regulate the actual relative position between the focal point 18 and the workpiece 10 according to a set relative position by positioning the at least one optical component, the workpiece 10 and/or moveable parts of the laser material processing system on the basis of the calculated actual relative position between the focal point 18 and the workpiece 10. Herein, the processing unit 32 detects a mismatch of the actual position and the predetermined motion sequence and controls the actuator system 34 to adapt the movement in such a way, that the mismatch is corrected and the system will be redirected to follow its predetermined motion sequence. Herein, small deviations from the predetermined motion sequence may be corrected within a view time steps and for larger deviations a new motion sequence or curvature may be calculated to maintain a smooth sequence of the focal point 18 on the workpiece 10.

Moreover, the processing unit 32 may not only be adapted to control the actuator system 34 but may also be adapted to control the laser power of the laser beam 12. As it is well known in the art, that the laser power to perform a certain Laser Material Process, such as laser welding or laser cutting, is almost linearly dependent on the processing speed, it is advantageous to control the current laser power in accordance with the calculated relative actual velocity to obtain a constant quality of the Laser Material Process. Furthermore, the current laser power can also be controlled to be in accordance with the calculated actual relative position between the focal point 18 and the workpiece 10 in order to take into account locally different material properties of the workpiece 10, such as material thickness of the workpiece 10. The rate for altering laser power has preferably the same order of magnitude as the sample rate of the at least one inertial sensor 24.

The laser beam 12 may be coupled into the optical system 16 by means of an optical fiber 20, wherein the end of the optical fiber 24 is held in a fiber holding part 36. The laser beam 12 exiting the end of the optical fiber 20 is collimated by means of a collimator optical unit 22 and guided to a tilted plane mirror 38 or an beam splitter 38, which guides the laser beam 12 in the direction of the focusing lens 40. The focusing lens 40 focuses the laser beam 12 on the workpiece 10 or to a defined position relative to the workpiece 10 into the interaction zone 64 on the workpiece 10, in order to carry out the laser material process. An inertial sensor 24 may be fixed to the focusing lens 40 to detect its acceleration, preferably to a peripheral part thereof so as not to interact with the laser beam 12.

As shown in FIG. 1, an inertial sensor 24 may be fixed to the tilted plane mirror 38 in a middle part thereof. In particular, the inertial sensor 24 may be located in the tilting axis of the tilted plane mirror 38. In this case, the inertial sensor 24 is a yaw rate sensor or a gyroscope for detecting the yaw rate or the rotational acceleration of the tilted plane mirror around its rotational axis. However, if the tilted plane mirror 38 serves as an beam splitter 38, as shown in FIG. 2, the inertial sensor 24 is preferably fixed to a peripheral part of the beam splitter 38 so as not to interact with the laser beam 12.

Moreover, the laser material processing system may comprise a laser processing head 42 that comprises the casing 30 for accommodating the optical system 16. Further the at least one inertial sensor 24 may be fixed to the casing 30 of the laser processing head 42 to detect the acceleration of the whole laser processing head 42.

Figure 2:
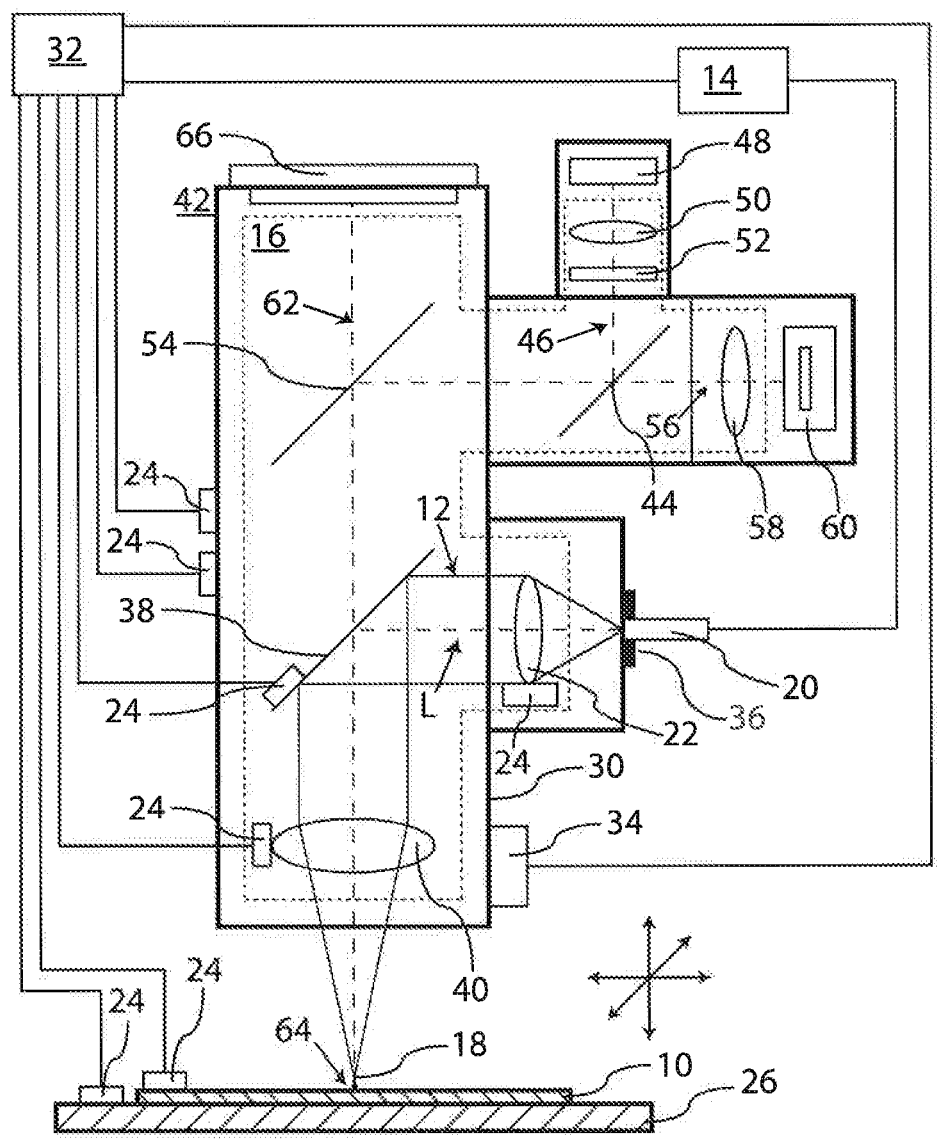
FIG. 2 shows a simplified schematic view of a laser processing system according to another embodiment of the present invention.

As shown in FIG. 2 the laser material processing system may further comprise typical components that are normally used in laser material processing, to which inertial sensors 24 may be fixed.

A second beam splitter 44 may be provided in the casing 30 of the laser processing head 42, in particular in the transit area of the laser beam 12, in such a way, that an observing optical path 46 (indicated by its optical axis) of a camera 48 is coaxially coupled in the optical path of the laser beam 12. In the observing optical path 46, there is located an projecting lens 50 and an optical band pass filter 52 in front of a camera 48.

In the observing optical path 46 there is further located a third beam splitter 54 between the second beam splitter 54 and the band pass filter 52 by means of which an illuminating optical path 56 (indicated by its optical axis) is coaxially coupled in the observing optical path 46 by means of an optic 58 of a illumination device 60 and, thus, in the optical path of the laser beam 12.

Further, by means of the second beam splitter there is decoupled a sensor optical path 62 from the optical path of the laser beam 12, which is guided to an radiation-sensitive receiver arrangement 66 fitted to the casing 30 of the laser processing head 42 or integrated in the latter. The radiation-sensitive receiver arrangement 66 is located in the opposite direction to the focusing lens 40 that focuses the laser beam 12 into the interaction zone 64 on the workpiece 10. Radiation, in particular optical radiation and light from the interaction zone 64 and a region surrounding the latter, from which information about the laser material process can be extracted, is led back by the focusing lens 40 via the first and second beam splitter 38, 44, along the optical path of the laser beam 12 and the sensor optical path 62, respectively. Thereby, the radiation-sensitive receiver arrangement 66 serves for process monitoring in order to monitor the laser material process. Preferably, the radiation-sensitive receiver arrangement 66 comprises several photo diodes (not shown) as optical sensors that are combined with spectral filters to measure the process radiation at different wavelengths. Commonly used monitoring systems comprise photo diodes and spectral filters to monitor plasma radiation, back reflection radiation and temperature dependent radiation.

Figure 3A:
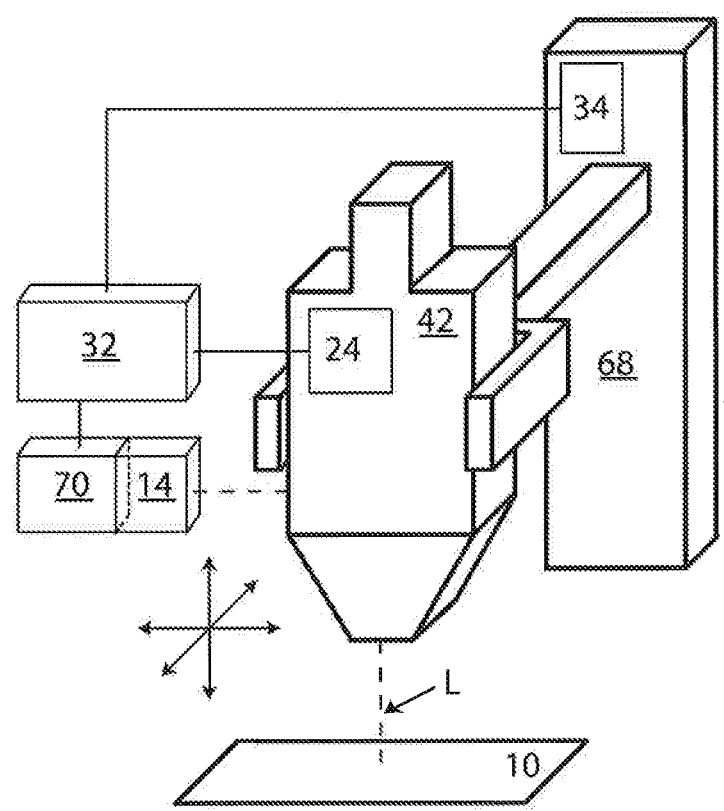
FIG. 3A shows a simplified perspective view of a laser processing system having an inertial sensor fixed to a laser processing head according to an embodiment of the present invention.

A further embodiment of the present invention is shown in FIG. 3A, that comprises the laser processing head 42 having the casing 30 for accommodating the optical system 16, a robot 68 or robot arm 68 or autonomous robot 68 (in the following just referred to as robot) and the workpiece 10. An inertial sensor 24 is fixed to the casing 30 of the laser processing head 42 and is connected to the processing unit 32. The processing unit 32 is further connected to the actuator system 34 that is adapted to control the robot 68 in such a way that the robot 68 can freely move the laser processing head 42 in accordance with a motion sequence. The processing unit 32 is further connected to a laser power control unit 70 that controls the laser power of the laser source 14. The laser source 14 emits the laser beam 12 that may be coupled to the laser processing head 42 via an optical fiber and is guided to and focused on or relative to the workpiece 10 by the laser processing head 42. The inertial sensor 24 detects the acceleration of the laser processing head 42. The processing unit 32 connected to the inertial sensor 24 determines the relative transitional and/or rotational acceleration of the laser processing head 42. In this embodiment, the workpiece is stationary and the laser processing head 42 is moved by means of the actuator system 34. Thus, by detecting the acceleration of the laser processing head 42, it is possible to determine the relative transitional and/or rotational acceleration between the focal point 18 and the workpiece 10.

The processing unit 32 is adapted to calculate the actual velocity and/or the actual relative position of the laser processing head 42 and thus, between the focal point and the workpiece 10, on the basis of the detected transitional and/or rotational acceleration by integrating over time having a respective initial velocity $v_0$ and/or a respective initial relative position $x_0$.

The actuator system 34 adjusts the relative position between the focal point and the workpiece 10 by positioning the laser processing head 42. Herein, the actuator system 34 is adapted to regulate by means of a feedback control an actual position of the laser processing head 42 to a set position on the basis of the calculated actual position of the laser processing head 42.

Moreover, the processing unit 32 is adapted to control the current laser power of the laser beam 12 by means of the laser power control unit 70 in accordance with the calculated velocity and/or the calculated position of the laser processing head 42. As stated above, the required laser power is substantially linearly dependend on the processing speed, the laser power is increased under the control of the processing unit 32 if the calculated actual velocity is comparably high or higher than a desired processing speed and the laser power is decreased under the control of the processing unit 32 if the calculated actual velocity is comparably low or lower than the set processing speed.

Figure 3B:
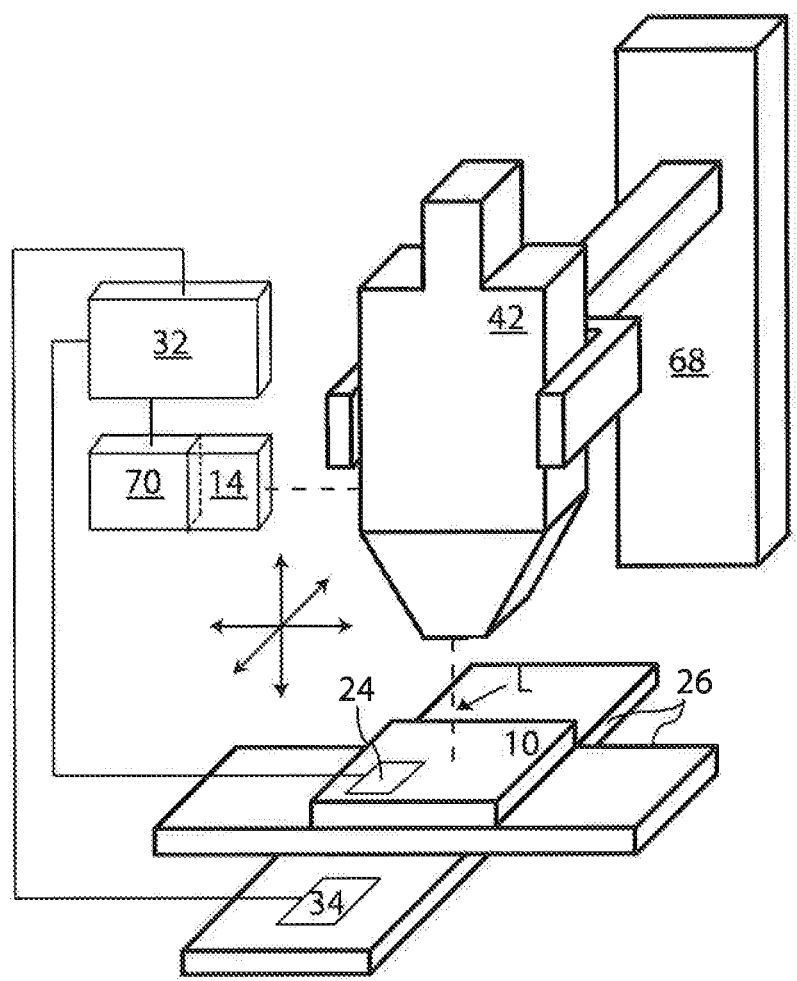
FIG. 3B shows a simplified perspective view of a laser processing system having an inertial sensor fixed to a workpiece according to an embodiment of the present invention.

The embodiment shown in FIG. 3B is very similar to the embodiment shown in FIG. 3A. Herein, the laser processing head 42 is stationary and the workpiece 10 is movable. Therefore, the inertial sensor 24 is fixed to the workpiece 10 and the workpiece 10 is moved by means of the actuator system 34 to adjust a position of the workpiece 10 and, therefore, the relative position between the focal point 18 and the workpiece 10. The processing unit 34 is adapted to control the actuator system 34 to regulate the actual position of the workpiece 10 to a set position by positioning the workpiece 10 on the basis of the calculated actual relative position of the workpiece 10. Further, the processing unit 32 is adapted to control the laser power of the laser beam 12 in accordance with the calculated actual velocity and/or the calculated actual relative position of the workpiece 10. As stated above, to ensure a constant quality of the laser cut or laser weld or the like during the laser material process, the laser power is increased under the control of the processing unit 34 if the processing unit 32 determines a comparably high velocity of the workpiece 10 and the laser power is decreased under the control of the processing unit 32 if the processing unit 32 determines a comparably low processing speed.

Figure 3C:
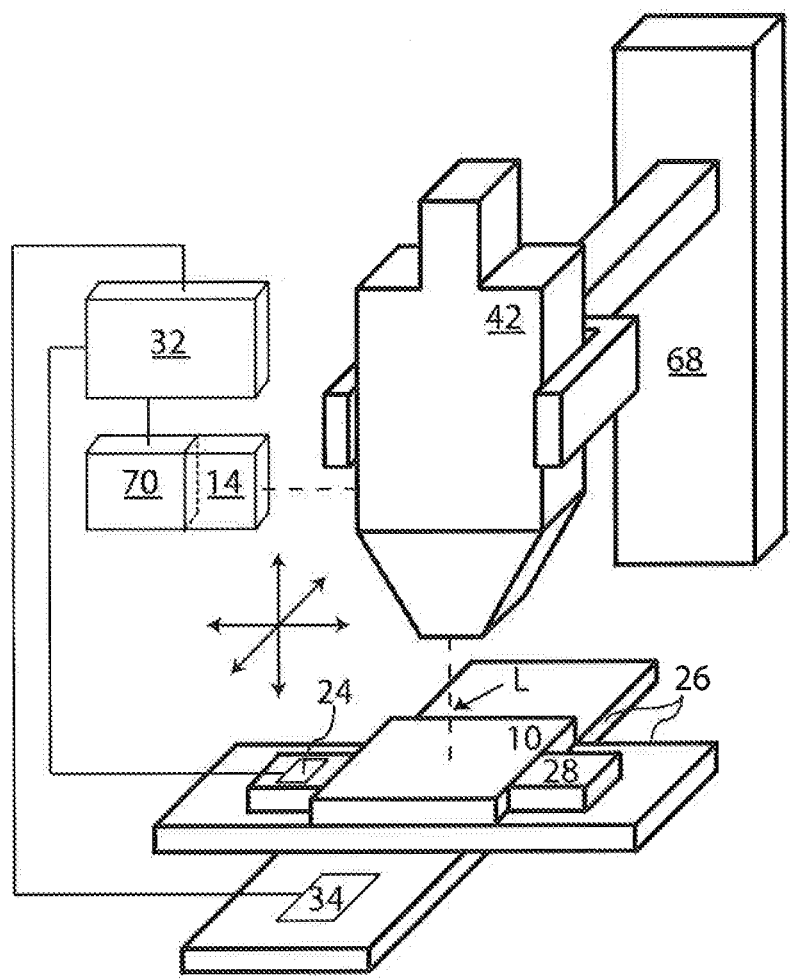
FIG. 3C shows a simplified perspective view of a laser processing system having an inertial sensor fixed to a moveable table according to an embodiment of the present invention.

The embodiment shown in FIG. 3C is similar to the embodiment shown in FIG. 3B. Here, the movable table 26 holds the workpiece 10 on a holding part 28 and the inertial sensor 24 is mounted or fixed to the holding part 28 of the movable table 26. The processing unit 32 is adapted to calculate the actual velocity and/or actual position of the workpiece 10 on the basis of the detected transitional and/or rotational acceleration of the movable table 26 or the holding part 28 by integrating over time having a respective initial velocity $v_0$ and/or a respective initial position $x_0$ of the workpiece 10 and the movable table 26. Herein, the actuator system 34 is adapted to adjust the position of the movable table 26 and, therefore, the position of the holding part 28 and the workpiece 10. Hence, the actuator system can adjust the relative position between the focal point 18 and the workpiece 10 by moving the movable table 26. Further, the processing unit 32 is adapted to control the actuator system 34 to regulate and actual position of the movable table 26, and, hence, the workpiece 10, to a set position of the movable table 26, and hence the workpiece 10, by positioning the movable table 26 on the basis of the calculated position of the movable table 26.

Further, the processing unit 32 is adapted to control the current laser power of the laser beam in accordance with the calculated actual velocity and/or the calculated actual position of the movable table 26 and, hence, the workpiece 10. As stated above, the laser power is increased under the control of the processing unit 32 if the calculated actual velocity is higher than a desired processing speed and the laser power is decreased under the control of the processing unit 32 if the calculated velocity of the movable table 26 is lower than a desired processing speed.

In case that the actuator system 34 is adapted to control the movement of the workpiece 10 and of the laser processing head 42, it is preferred that an inertial sensor 24 is fixed to the laser processing head 42 as well as to the workpiece 10 or the movable table 26. Further, in this case, the processing unit 32 is adapted to determine a relative transitional and/or rotational acceleration between the laser processing head 42 and the workpiece 10 by taking into account the acceleration data of the inertial sensors 24 of the workpiece 10 and of the laser processing head 42, e.g. by adding them up.

It is also possible to include further inertial sensors 24 in the laser material processing system, even in/on components that are not intentionally moved by the actuator system to monitor their acceleration, movement or position in such a way that none-intentional movements of these components due to vibrations or external forces from the environment can be detected.

Although, only one inertial sensor 24 is shown for each movable component in the FIGS. 3A to 3C, it is preferred to have at least one inertial sensor 24 fixed to each movable component. Having more than one inertial sensor per movable component, i.e. at least two inertial sensors 24 per movable component, the acceleration data from these individual inertial sensors 24 can be averaged or correlated to reduce signal noise (i.e. noise reduction) or to distinguish between systematical and statistical errors in the noise signals, e.g. to perform a low-threshold drift detection of the respective component. To reduce the signal-to-noise ratio of the acceleration data, the processing unit 32 is preferably adapted to calculate a mean transitional and/or rotational acceleration on the basis of the acceleration data from the at least two inertial sensors 24 fixed to the same or to different moveable component(s) and/or to correlate the acceleration data from the at least two inertial sensors 24.

Commonly used industrial robots for adjusting the laser processing head 42 and/or the workpiece 10 can output its current velocity directly. However, the output ratio has a very low frequency, e.g. twice per second. Nevertheless, this information can be used to recalibrate the inertial sensor 24 on the fly. Preferably, the calibration is done under the circumstance that the robot 68 performs a long-term linear movement without any changes of direction or speed of the robot 68. Besides, the inertial sensors 24 can be calibrated in idle position by use of the gravitational force. In this case, the inertial sensors 24 should be arranged in such a way that none of their detecting directions is fully orthogonal to the direction of the gravitation force, i.e. all of their detection directions should have a downward component. To this end, the processing unit 32 can be adapted to calibrate or recalibrate the at least one inertial sensor 24 at subsequent time points on the basis of calibration data provided, e.g., from the robot 68 or by means of the gravitational force. Thereby, an error in the acceleration data can be reduced.

There are several different inertial sensors 24 on the market that differ inter alia in their sensibility. For high processing speeds, inertial sensors 24 having a low sensibility are sufficient. However, for low processing speeds inertial sensors 24 with a higher sensibility are preferred. It is also possible to combine inertial sensors 24 having different sensibilities in one laser material processing system in order to reliable detect the transitional and/rotational acceleration in fast processes, such as a cutting process, and slow processes, such as a welding process.

According to further embodiment of the present invention, it is possible to support the laser material processing system with a three dimensional model of the workpiece 10 in spatial coordinates, and the processing unit 32 controls the actuator system 34 in such a way that the actuator system 34 moves the movable parts of the laser material processing system to perform a predetermined spatial cutting or welding process.

The inertial sensors 24 are preferably fixed relative to an optical component of the workpiece 10 to detect acceleration between the focal point 18 and the workpiece 10 in the interaction zone 64. Depending on the component to which the respective inertial sensor 24 is fixed to, different kinds of inertial sensors 24 are chosen. For example, an inertial sensor 24 that is coupled to a component that is subjected to a transitional movement, such as the focusing lens 40 or the laser processing head 42, is preferably an accelerometer for detecting a transitional acceleration. Whereas, inertial sensors 24 that are coupled to components that are subjected to a rotational movement, such as a focusing mirror 38 or the laser processing head 42, are preferably gyroscopes or yaw rate sensors for detecting an angular acceleration.

In laser material processing, transitional movements as well as rotational movements of the laser processing head 42 and/or the workpiece 10 are commonly used processing operations and, hence, it is advantageous to combine accelerometers and gyroscopes in one laser material processing system. Herein, it is preferred that the gyroscopes are centered in the respective rotational axis, e.g. the optical axis L of the laser beam 12.

The accelerometers of the at least one inertial sensor 24 can be used to determine a mismatch between the actual position between the focal point 18 and the workpiece 10 and a desired set position. With the known mismatch, it is possible to recalibrate the sensor data of the camera 48 or the radiation-sensitive receiver arrangement 66 so as to enhance an overlap of the interaction zone 64 in the sensor data in order to facilitate the analysis of subsequent frames.

Moreover, the interaction zone 64 comprises a profile (keyhole) that depends on the propagation direction between the focal point 18 and the workpiece 10 and, hence, changes significantly when the direction of the movement is changed. Therefore, it is advantageous that the processing unit 32 is not only adapted to calculate the actual velocity or relative position as an absolute value but also a velocity vector on the basis of subsequent sensor data points that indicates the direction of the acceleration or movement. With the calculated propagation direction, i.e. the velocity vector, it is possible to rotate the individual frames of the camera 48 so that the profile of the interaction zone 64 is aligned in the same direction in all frames. Here, in the case that no rotation occurs during the movement, the profile as detected, e.g. by the camera 48, changes significantly due to directional, i.e. transitional, changes of the movement as the profile depends on the propagation direction and an orientation of the camera 48 keeps unchanged.

Further, by assigning the calculated position to each sensor data point or sensor frame, it is possible to plot the sensor data versus the position rather than process duration providing the user with a more intuitive illustration of the sensor data. In these position-related plots, the mismatch between processing time and processing position due to a non-constant processing speed is compensated. Thus, a sensor data point indicating an error during the process can be easily found on the workpiece, since the sensor point is provided with its correct position.

In the following, a method for processing a workpiece 10 by means of a laser material processing system according to the present invention is described. First, the laser beam 12 is focused to form a focal point 18 either on the workpiece 10 directly or in a defined position relative to the workpiece 10 by means of an optical system 16 that has at least one optical component. Then, a transitional and/or rotational acceleration of the at least one optical component of the optical system 16 and/or of the workpiece 10 is detected by means of at least one inertial sensor 24. Subsequently, the relative transitional and/or rotational acceleration between the focal point 18 and the workpiece 10 is determined by means of a processing unit 32 that is connected to the at least one inertial sensor.

In the following, a further embodiment of the present invention that comprises a cognitive framework is described, in which the processing unit 32 is further adapted to classify a current laser material process. Herein, the processing unit 32 is adapted to classify the laser processing process on the basis of feature values derived from data from at least one sensor comprising the camera 48, air-borne or solid-borne acoustic sensor, or the photo diode sensors of the radiation-sensitive receiver arrangement 66 for wave length ranges in the infrared, visible and ultraviolet range, wherein the calculated actual velocity is further used for the classification result as a feature value.

Cognitive systems benefit from additional senses. Cognitive production systems may also benefit from sensing acceleration next to optical or acoustical information. In manufacturing, laser material processing has several advantages over comparable technologies. Cognitive laser material processing systems offer a promising approach to ensure constant quality during laser welding and cutting processes. The experiments conducted show several approaches in which the cognitive laser material processing system may be improved with the additional velocity feature based on the calculated actual velocity. Knowledge about the position on the workpiece corresponding to recorded sensor data facilitates the training procedure. The distortion between a workpiece scan and the sensor data is minimized and, thus, allows for a better selection of training data by a human expert. The velocity feature also helps to prevent misclassifications at the start and end of the process. In doing so, the transient response of the cognitive system is improved. Finally, the expert is provided with an intuitive method of how to fine-tune the process by adjusting the closed-loop control system's set-point. Thus, the present embodiment of the present invention describes how cognitive production systems may be improved in performance by learning from additional senses such as accelerometry.

Over recent decades, laser material processing has become an important tool in the manufacturing industry.

Fast processing speed, the ability to join or cut thick material, a small heat affected zone and the absence of tool wear set laser material processing apart from other technologies. On the other hand, laser material processing is rather susceptible to process variations. These variations can be caused by changing compound of material, surface conditions and workpiece thickness. ISO 9000 and other law-enforced regulations have led to the understanding that quality control is essential. In order to make the advantages of laser material processing accessible to new markets, process monitoring and control may be further improved.

Cognitive technical systems are systems that utilize with artificial sensors and actuators, integrated into physical systems acting in a physical world. They incorporate the capabilities of perception, reasoning, learning, and planning. These cognitive capabilities may result in systems of higher reliability, flexibility, adaptivity, and better performance. An important aspect of cognitive technical systems is the ability of perception, which is commonly realized by a bio-inspired multi-sensor data fusion. The goal of combining data from multiple sensors is to retrieve information of a higher quality than would be possible if the data sources were used individually. Thus, the addition of a measurement for acceleration or velocity makes sense in a cognitive approach to a production system.

State-of-the-art monitoring systems utilize photodiodes combined with spectral filters in order to measure process emissions at different wavelengths. Some processing errors can be detected in deviations from predefined envelopes. More recent monitoring systems add cameras to their setup. Some systems also include sensors for acoustic emissions. Exploiting these process emissions, closed-loop laser power control of laser cutting and welding processes can be achieved. As no such system has been commercially available up to today, it is questionable if the sensory setup employed in the proposed methods is sufficient to succeed under industrial expectations.

Efforts to include velocity as a feature in laser material processing closed-loop control systems have been made. The measurement of correlations in successive camera frames has been proposed. However, the related method has a coarse resolution of 6 mm at 100 Hz. This resolution increases, at the cost of a lower measurement rate, if subpixel accuracy is taken into account. The velocity information can be used for online correction of robot movement errors of the robot 68 but not for closed-loop control. Furthermore, the position can be measured as deviation from a preprogrammed course. Thus, this approach needs training.

The embodiment of the present invention achieves the inclusion of the processing speed based on the calculated actual velocity in the cognitive framework presented above, in correspondence with the way humans experience acceleration and velocity It is a first advantage that improved visualization of process data is achieved. Correlating distinct points on the workpiece with sensor data is difficult for a human expert. Stages of acceleration and deceleration at the beginning and at the end of each workpiece distort the connection between workpiece scans and plotted process data. Displaying the sensor data with respect to its estimated position on the workpiece diminishes these distortions. Thus, the addition of a velocity feature should help to improve the supervision of the cognitive system.

It is a second advantage that improved closed-loop control is achieved. The laser power needed to achieve good quality cuts or welds is linearly dependent on both material thickness and processing speed. Thus, the quality achieved by the control system should improve, if velocity is added as input to the classifier.

It is a third advantage that a simplified method to fine-tune the process is achieved. Right now, the only way to influence the behavior of the cognitive laser material processing system is to add new sensor data to the training data set and recalibrate the classifier. The online estimation of the tool center point on the workpiece enables an alternative method. A setpoint can be defined along the laser's position on the workpiece. If the setpoint deviates from zero, the system will apply more or less laser power than it usually would have. Thus, the expert can adjust the process intuitively, independent of the processing speed.

Compared to the optical flow method, the accelerometer of the inertial sensor 24 provides more reliable velocity estimations. Thus, the inertial sensor 24 is integrated into the hard- and software framework. Experiments conducted for the present invention show that the cognitive laser material processing system benefits from the addition of a velocity feature. The supervision of the system by a human expert is aided by the more accurate display of the sensor data. Plotting sensor data with respect to the estimated tool center point leads to fewer distortions compared to its representation over time. In addition, the closed-loop quality control could be improved. Misclassification at the beginning and end of a process was prevented by the addition of the velocity feature to the classifier. Thus the transient response of the closed-loop control system was improved, resulting in a quicker achievement of good quality welds. Finally, experiments to fine-tune the laser power by adjusting the classifier's set-point were successful.

The accelerometer of the inertial sensor 24 measures proper acceleration, the physical acceleration experienced by an object relative to free-fall. The SI (Système International d'unités) quantifies acceleration as meters per second per second [$ms^{-2}$]. In popular terms it is also referred to as g-force [g]. However, the proper acceleration measured by an accelerometer is not necessarily the coordinate acceleration (rate of change of velocity). Instead, it is the acceleration associated with the phenomenon of weight experienced by any test mass at rest in the frame of reference of the accelerometer device. Thus, at terminal velocity, an accelerometer will display an acceleration of 9.81 $ms^{-2}$ or 1 g upwards.

In principle, accelerometers behave like a damped mass on a spring. External accelerations trans-late the proof mass from its neutral position. This translation can be measured in different fashions. Commonly used devices use piezoelectric, piezoresistive and capacitive components to convert the mechanical force into an electrical signal. Modern accelerometers are often realized as small MEMS (Micro Electro-Mechanical Systems).

Process control is an essential part of the manufacturing industry, wherein the key issue can be regarded as: keep essential quality variables at specified values, minimize the use of energy and raw material, and make rapid changes of production or grades.

Industrial manufacturing processes are subject to disturbances. Open-loop control systems cannot react to external influences on the process. Closed-loop control systems use sensors to measure feedback from the process. The system output is compared to a predefined setpoint in order to detect deviations from the desired system behavior. If errors are detected, the controller adjusts the system input according to the system model. Thus, closed-loop control systems can maintain constant quality under changing conditions.

Whenever the process dynamics or the characteristics of disturbances change over time, the use of adaptive control paradigms might be worthwhile. An adaptive controller is defined as a controller with adjustable parameters and a mechanism for adjusting the parameters. The choices of how to implement parameter adjustment include gain scheduling, auto tuning, model-reference adaptive control, self-tuning control, and dual control. However, not all processes are controllable. In some cases, important system parameters are hidden from observation (observability) or the output of the system approaches infinity (stability).

Cognition can be defined as the ability to learn how relevant information about the environment can be extracted, how this information can be interpreted, and, based on this information, how to respond to these circumstances. A cognitive perception-action loop is introduced in order to deal with challenges arising from mass customization. This concept of technical cognition can be incorporated for production systems and validates its functionality with experimental data of laser material processing. A production system with cognitive capabilities is composed of five stages. The system gathers information about its environment using whatever sensory input is available (perception). It abstracts relevant information about the process from sensor noise and irrelevant data (learning and reasoning). Using this information, the cognitive system of the present invention builds a model fit to represent its environment (knowledge and models). Taking into account its past actions, the system adapts its model to improve the performance (planning and cognitive control). Finally, the system interacts with its environment, changing a control system's parameters or asking a human expert for feedback (action).

In the following some of the basic mathematical principles used to equip technical systems, such as the processing unit 32 of the present invention, with cognitive capabilities are described.

Dimensionality reduction implements the learning and reasoning part of the cognitive perception-action loop. Most high dimensional signals can be reduced to a small number of features while preserving most of their information. Also, by disregarding irrelevant information, dimensionality reduction can improve classification performance.

The Principle Component Analysis is a transformation used to decorrelate a set of observations. The resulting features separate a data set by variance. The goal is to find the lower dimensional representation of a new sample with greatest variance possible. Firstly, the covariance matrix is computed from previous samples. The covariance matrix is used to calculate the system's eigenvalues $\lambda$. Then, the eigenvectors U are computed. Most of the variance in the data set is captured with only a few eigenvectors. Thus, effective dimensionality reduction can be achieved using a mapping, with a reduced set of eigenvectors. A new sample can be transformed to its representing vector in the new coordinate system. Since Principle Component Analysis doesn't include any knowledge about the classes a sample belongs to, it can be seen as an unsupervised method.

Linear Discriminant Analysis is a method that constructs a mapping that best discriminates among different classes. Since Linear Discriminant Analysis incorporates knowledge about a data set's class, it is a supervised method.

The original Fisher discriminant analysis was designed for a two-class problem. Since we usually deal with more than two classes, there will only be introduced the multiclass extension of the Linear Discriminant Analysis briefly. Linear Discriminant Analysis calculates features that emphasize the difference between data sets of classes. In order to do so, the Fisher criterion needs to be maximized. It can be shown, that the optimal mapping is obtained by solving the eigenproblem.

Classification realizes the knowledge and models part of the cognitive perception action loop. The task of classification is to learn how important events that affect a workpiece's quality are represented in the reduced feature space.

The Support Vector Machine is an example of a classifier. The Support Vector Machine seeks to find a linear decision function that minimizes the prediction error on a training set while promising the best generalization. If the training data set is only separable by nonlinear class boundaries, Support Vector Machine searches for a mapping into a high-dimensional feature space that allows for a linear model to be constructed. This model is also known as maximum margin hyperplane, which gives maximum separation between decision classes. The training examples closest to the hyperplane are called support vectors. The Support Vector Machine is applicable to cognitive laser material processing systems.

Previous work on cognitive laser material processing established a closed-loop control system, wherein processed available sensor data were processed using feature extraction and classification algorithms. The resulting laser material processing system is able to predict the quality of a workpiece 10 and detect processing errors. Faults that can be avoided by adjusting the laser power are compensated for with high probability. However, while taking into account optical and acoustical process emissions, one of the most important features has been disregarded: velocity. The laser power needed to achieve a good quality weld or cut is approximately linearly dependent on the velocity of the processing head relative to the workpiece. In the following, the experimental setup is described, and methods to estimate the velocity of the tool center point are presented.

The experimental setup or laser material processing system of the present invention used in the welding trials comprises a high precision industrial robot 68 that guides the tool over the workpiece 10. The laser is focused on the workpiece 10 by the welding head 42. The laser material processing system according to the embodiment of the present invention comprises the following sensors:

- the camera 48: The CMOS camera 48 is mounted coaxially and can therefore observe the process directly through the welding head 42. A chip on the camera 48 allows for fast preprocessing of the camera pictures.
- a plurality of photodiodes of the radiation-sensitive receiver arrangement 66: at least three photodiodes measure optical process emissions at different wavelengths: temperature, plasma radiation, and laser back reflection, as described above.
- the at least on inertial sensor 24 having an accelerometer: A three axis accelerometer is fixed to the housing of the processing head 42. The accelerometer is connected to the processing unit 21 that denoises the measured acceleration with a median filter.

Although, the present embodiment comprising the cognitive framework is only described in relation with the accelerometer of the at least one inertial sensor 24 fixed to the laser processing head 24, it should be understood that the features of the cognitive framework are not limited to this case. Instead, the cognitive framework can be adapted for any configuration of laser material systems according to the above embodiments of the present invention having at least one inertial sensor 24 fixed to one or different component(s).

Once the movement of the tool center point relative to the workpiece 10, i.e. the relative movement between the focal point 18 and the workpiece 10, has been accurately estimated, methods to introduce this new feature to the cognitive laser material processing framework are discussed.

In the following, a method to estimate motion during laser material processing by using the accelerometer of the at least one inertial sensor 24 in order to calculate the velocity is described. Once the velocity is estimated, the displacement s between the initial position $x_0$ and final position $x_1$ can be calculated:

$$s = \frac{1}{2}(v_0 + v_1)\partial t$$

where $v_0$ is the initial velocity, $v_1$ is the final velocity and $\partial t$ is the time between two measurements. Integration of s over t calculates the laser's position. i.e. the position of the focal point 18, relative to the workpiece 10.

If the acceleration a is detected directly by using the accelerometer of the at least one inertial sensor 24, the velocity v can then be calculated with the following formula:

$$v_1 = v_0 + a\partial t$$

where $v_1$ is the current velocity, $v_0$ is the initial velocity, and $\partial t$ is the time between two measurements or sensor data points. The sensor has typically the size dimensions of 4×4×1 mm. It is connected to a microcontroller. The microcontroller is equipped with an ADC (Analog Digital Converter) that samples signals from the accelerometer at a rate of 500 Hz. To limit the influence of noise, a median filter is applied to the measured values.

The plots of FIGS. 4A to 4D and 5A to 5D show a scan of the workpiece, the acceleration as measured by the accelerometer, the velocity calculated using the above equation, and the position of the laser focal point 18 on the workpiece 10 calculated using the above equations, respectively. Acceleration itself as a feature is difficult to assess. The signal has a poor SNR (Signal to Noise Ratio) and the unit $ms^{-2}$ is unintuitive. The velocity, however, is a smooth feature. The maximal velocity of 1 $ms^{-1}$ is observed correctly in the conducted trials. The velocity features of trials conducted at the same speed correspond to each other and can be correlated with the workpiece scan. However, especially when using slow processing speed, the measurement error adds up so that the tool center point on the workpiece 10 cannot always be predicted with satisfying precision. FIG. 4A shows a workpiece 10 processed at 0.48 $ms^{-1}$. Both logos are visible in FIG. 4D. FIG. 5A shows a workpiece 10 processed at 0.12 ms. As shown in FIG. 5D, the logos are heavily distorted.

There are many explanations for these distortions: Measurements are noisy. Errors made due to noisy recordings are integrated two times in order to calculate the position on the workpiece 10. In addition, the time difference $\partial t$ was created artificially after the process, because no real-time clock was available on the microcontroller of the processing unit 23 in this embodiment. Most importantly, the inertial sensor 24 is attached to the process head 42 using cable ties. This makes this setup rather vulnerable to vibrations.

Further, three basic aspects for including a velocity feature in the classification process are:

Achievement 1: Improved visualization of process data. Data sets of more than ten welding trials were recorded. Process envelopes were calculated for each of the following quality states: 'laser power too low', 'laser power ok', and 'laser power too high'. The remaining two workpieces 10 are laser power ramps used as a reference. Two ways to illustrate the sensor data are compared: plots over time and plots over the laser's position on the workpiece 10. In order to show the sensor data with respect to the tool center point, the data is stretched or compressed, depending on the estimated velocity.

Achievement 2: Improved closed-loop control. Velocity is one of the most important parameters in laser material processing. The laser power needed to produce a weld or cut with satisfying quality is linked approximately linearly to the processing speed. In order to add the tool center point speed to the system, the control program, running on a real-time operating system, was enhanced by a routine that receives the current acceleration from the new sensor.

Achievement 3: Simplified method to fine-tune the process. In former experiments the controller's set-point was always set to the 'laser power ok' class. In order to provide the human expert with a quicker and more intuitive way to fine-tune the process, the ability to adjust this set-point was implemented. While this implementation still defines the set-point for each time step of the process, future implementations could define the set-point with respect to the tool center point on the workpiece 10.

The following contains the results of three experiments that demonstrate how information about the process velocity can be exploited in order to achieve advantageous features of to the present invention. The experiments will show that the addition of a velocity feature improves the system's transparency and usability, and the closed-loop control system's performance in terms of quality. Finally, a method of enabling the user to influence the process directly without re-teaching the control system is demonstrated.

Usually, sensor data is visualized as feature amplitude over time. In the case of our cognitive laser material processing framework, an expert selects data suited to represent classes of different workpiece quality levels directly from these plots. In the trials, the high precision industrial robot 68 moves the processing head 42 over the workpiece 10 in order to create a straight weld seam. A constant velocity is assigned to each of the robot's movements and is assumed to be piecewise constant for each of the preprogrammed sections. Acceleration and deceleration phases are neglected. This leads to a notable distortion between what the expert sees on the workpiece 10 and what he selects as sensor data. In order to visualize the difference between plotting sensor data with respect to time and plotting the measurements with respect to the corresponding position on the workpiece 10, 14 trials were conducted. Twelve of these trials were used to define process envelopes. The processing speed was set to a constant velocity of 0.2 $ms^{-1}$ and 0.3 $ms^{-1}$ each for half of the workpieces 10. For both velocities two trials for each of the following process states were conducted: LP too low, LP ok, and LP too high. The remaining two workpieces 10 are processed with a laser power ramp from 1000 W to 4000 W at 0.2 $ms^{-1}$ and 0.3 $ms^{-1}$ and serve as reference data for the experiment.

FIGS. 6A to 6D and 7A to 7D show a comparison of two ways to visualize sensor data. FIGS. 6B to 6D features plots over time. In order to create process envelopes from welds created at different processing velocities, the sensor data's timestamps are normalized. This is done assuming a constant velocity over the whole workpiece 10. In FIG. 7B to 7D the velocity as recorded by the accelerometer of the at least one inertial sensor 24 fices to the casing 30 of the laser processing head 42 is used to estimate the location of the sensor data's origin on the workpiece 10. In both figures, the process start and process end are marked as those areas on the workpiece 10, where the photodiode signals are nonlinear. On the workpiece scan the process start is the area where the laser beam 12 did not fully penetrate the metal. At the end of the process, the laser power was so high that the beam cut the workpiece 10 rather than producing a weld seam, which is also visible on the workpiece 10. The results show, that the distortion between workpiece 10 and plotted sensor data is reduced, if velocity information is used to compensate for acceleration and deceleration of the robot 68 during the process.

Furthermore, a second set of trials was conducted to show the potential benefit of adding the velocity as input to a closed-loop control laser material processing system. Experiments included workpieces of 0.8 mm thickness that were processed at 0.2 ms$^{-1}$ and 0.3 ms$^{-1}$. The initial laser power was set to a value that was either too low (1200 W) or too high (3500 W). For each configuration two control trials were made: one, where only the photodiodes were connected to the classifier, and one where velocity was passed as additional input.

FIGS. 8A to 8C and 9A to 9C show an excerpt of the results. Both workpieces 10, as shown in FIGS. 8A and 9A, respectively, were processed at 0.2 ms$^{-1}$ with an initial laser power of 3500 W. In both cases, the control system was able to reach a process state it recognized as good quality. However, without information about the present velocity, as shown in FIGS. 8A to 8C, the system misclassifies the start and the end of the process. Although the workpiece scans show that the laser power was too high, the classifier of the processing unit 32 tries to further increase the laser power. This error is compensated for by adding the velocity feature to the classification, as shown in FIGS. 9A to 9C. Both process start and process end are classified correctly. Consequently, the controller reaches a stable state after about 0.01 m as opposed to the 0.05 m needed in the previous trial.

Furthermore, a third set of trials provided the operator with a means to influence the process directly. Up to now, the only way to interact with the control system has been to reteach the classifier with new training data. If you are used to calibrating a production machine by setting the laser power, this may seem unintuitive. As an alternative, the classifier set-point is propose to be variable instead of being always set to that value, which represents the class containing good quality welds or cuts. In order to investigate this method, two trials were conducted where the classifier set-point was altered from −1 (laser power too low) to 1 (laser power too high), as shown in FIGS. 10A to 10D, and vice versa, as shown in FIGS. 11A to 111D. In FIG. 10B at the transit from LP too low to LP ok at app. x=0.06 m and in FIG. 11B at x=0.2 m, the lowest plot is the laser back-reflection feature, the second lowest plot is the temperature feature, the second uppermost plot is the plasma feature, and the uppermost plot is the velocity feature. Results show, that the closed-loop control system was able to follow the set-point. Both FIGS. 10C and 11C show a transition through the different classes as desired by the set-point. Thus, changing the control system's set-point is an efficient way to influence the laser power applied to the workpiece 10 without re-teaching the classifier. Combined with the results presented above, the set-point can be input along the position of the laser on the workpiece 10. Thus, processing speed remains variable while the operator is enabled to fine-tune the quality of the workpiece 10.

In summary, the experiments conducted in correlation with the present invention demonstrate that the addition of a velocity feature benefits the cognitive laser material processing framework in several ways. Plotting sensor data with respect to the origin on the workpiece 10 facilitates the teaching process for a human expert by minimizing the distortion between workpiece picture and visualized sensor data. The closed-loop control system's transient response is improved by providing enhanced input for the beginning and the end of a process. Finally, the human expert can be provided with an intuitive method of fine-tuning the process by adjusting the control system's set-point. According to the present invention, it is preferred to use inertial sensors 24 with a metal casing 30 that is attached to the processing head 42. This should prevent dampening caused by the loose suspension. Since the accelerometer of the at least one inertial sensor 24 is an inexpensive electrical component, multiple units could be combined and averaged in order to minimize sensor noise. The addition of a real-time clock to the microcontroller of the processing unit 32 that is reading the sensor data could improve the calculation of velocity and position on the workpiece 10. Right now, the timestamps used for these calculations are those of the retrieved data on the workstation and not the time of the actual measurement. Apart from calculating the velocity from the measured acceleration, there is another way to retrieve information about the current processing speed. The industrial robot 68 can output its current velocity directly. However, the output value refreshes only twice per second. Nevertheless, this information could be used to recalibrate the inertial sensor 24 on the fly.

During the experiments, the accelerometer of the at least one inertial sensor 24 had problems detecting motion slower than 0.2 ms$^{-1}$. Combining a further accelerometer with a higher sensibility for moderate stimulations with an inertial sensor having the above sensibility could enable the system to be applied in fast cutting processes as well as in slow welding procedures, which is a preferred embodiment of the present invention.

Apart from laser power and velocity, the thickness of the workpiece 10 is one of the most important parameters. Now that we can estimate the tool center point's current position, we can provide the system with information about the workpiece geometry. That information could either be input manually, or read from a CAD (Computer Aided Design) file describing the workpiece.

Finally, the velocity vector may be used to calculate the angle between the current orientation and the preferential processing direction. This could be an alternative to the method of extracting direction-independent features from camera pictures. If the processing head 42 itself is turned, the accelerometer of the at least one inertial sensor 24 can be combined with a yaw rate sensor in order to compensate for multidirectional movement.

Embodiments of the present invention investigate the addition of a sense of acceleration to a cognitive production system such as laser material processing. Inter alia, methods for obtaining the current velocity of the robot guiding the laser beam over the workpiece are investigated.

While optical flow performed well in previous work in some experiments, the investigated accelerometer of the at least one inertial sensor 24 proved to be applicable to a wider range of laser machining processes. The measured acceleration allows for an estimation of the velocity and the tool center point's current position on the workpiece 10. The most noteworthy experimental result is that the sense of acceleration improves the workpiece quality achieved by the closed-loop laser power control system. Misclassification caused by acceleration or deceleration of the robot 68 guiding the laser beam 12 is prevented. Thus, the transient response of the cognitive production system is improved.

An improved sensor sensitivity is preferred for motions slower than 0.2 ms$^{-1}$. Methods for calibration and noise reduction can prevent the accumulation of errors and increase the accuracy of the estimated tool center point position or the relative position between the workpiece 10 and the focal point 18. Once the precision of the sensor is improved, metrology systems may minimize the effect of changing velocities on their results. Eliminating the influence of velocity from features calculated by cognitive production systems is a first step towards generating uniform process characteristics. Distributed cognitive production systems may exchange empirical values gathered about their processes on a higher level. Thus, production systems all over the world may benefit from the supervision of a single expert.

In summary, the present invention includes the online measurement of the velocity at which the tool center point of a laser machining head 42 is moved relative to a workpiece 10. The measured feed rate is used as part of the input to a closed-loop quality control system that adjusts the laser power based on an estimated state of workpiece quality and the measured velocity of the tool center point. Further, rotations are captured alongside the velocity of the tool center point. Thus, the whole geometry of any two- or three-dimensional manufacturing process can be extracted and used in data processing algorithms connected with the control of the laser machining.

An inertial sensor 24 can be attached to the processing head 42 and/or to the workpiece 10, depending on which part of the assembly performs the movement. The velocity is calculated by integration of the measured acceleration over time. If the processing head 42 is rotated during operation, this motion can also be captured, e.g. using a yaw rate sensor.

The laser power at which good quality cuts or welds can be achieved is nearly linearly dependent on the processing speed, as shown in FIG. 12. Thus, information about the current velocity of a process can be used in order to improve the closed-loop control of laser welding and laser cutting. In addition, taking into account the current velocity of a process, the visualization of laser machining can be enhanced by compensating for accelerations and decelerations of the robot 68. In doing so, distortions between plotted sensor data and workpiece 10 are minimized. Thus, the expert setting up laser material processes is aided during setup and supervision of such processes.

The invention claimed is:

1. A laser material processing system for processing a workpiece by means of a laser beam, comprising:
    an optical system having at least one optical component for focusing the laser beam to form a focal point on the workpiece or in a defined position relative to the workpiece;
    at least one inertial sensor for detecting a transitional and/or rotational acceleration of the at least one optical component of the optical system and/or the workpiece; and
    a processing unit connected to the at least one inertial sensor for determining a relative transitional and/or rotational acceleration between the focal point and the workpiece,
    wherein the processing unit comprises a real-time clock for allocating a real-time timestamp to each sensor data and is adapted to calculate an actual velocity and/or actual relative position between the focal point and the workpiece on the basis of the detected transitional and/or rotational acceleration by integrating over time by using the allocated timestamps and having a respective initial velocity ($v_0$) and/or a respective initial relative position ($x_0$), and
    wherein the processing unit is adapted to control an actuator system to regulate an actual relative position between the focal point and the workpiece to a set relative position by positioning the at least one optical component and/or the workpiece on the basis of the calculated actual relative position between the focal point and the workpiece.

2. The laser material processing system according to claim 1, further comprising an actuator system for adjusting a relative position between the focal point and the workpiece by positioning the at least one optical component and/or the workpiece.

3. The laser material processing system according to claim 1, wherein the processing unit is adapted to control the current laser power of the laser beam in accordance with the calculated relative actual velocity and/or the calculated actual relative position between the focal point and the workpiece.

4. The laser material processing system according to claim 1, wherein at least two inertial sensors are fixed relative to one optical component of the optical system and/or the workpiece, and wherein the processing unit is adapted to calculate a mean transitional and/or rotational acceleration on the basis of the acceleration data from the at least two inertial sensors.

5. The laser material processing system according to claim 1, wherein the at least one inertial sensor is fixed to the workpiece.

6. The laser material processing system according to claim 1, further comprising a moveable table for holding the workpiece on a holding part thereof, wherein the at least one inertial sensor is fixed to the holding part of the moveable table.

7. The laser material processing system according to claim 1, further comprising a laser processing head having a casing for accommodating the optical system, wherein the at least one inertial sensor is fixed to the casing of the laser processing head.

8. The laser material processing system according to claim 1, wherein the optical system comprises a focusing lens for focusing the laser beam on the workpiece or to a defined position relative to the workpiece, and the at least one inertial sensor is mounted in a fixed position relative to the focusing lens.

9. The laser material processing system according to claim 1, wherein the optical system further comprises:
    an optical fiber; and
    a collimator optical unit for collimating the laser beam emitted from the optical fiber, wherein the at least one inertial sensor is mounted in a fixed position relative to the collimator optical unit.

10. The laser material processing system according to claim 1, wherein the optical system comprises at least one plane mirror or focusing mirror, to which the at least one inertial sensor is fixedly mounted.

11. The laser material processing system according to claim 1, further comprising:
    a camera with an imaging optical unit arranged upstream thereof in the beam path of the laser beam and serving for observing a processing region of the workpiece, which is processed by means of the laser beam; and
    an illumination device, the light from which is coaxially coupled into the beam path of the laser beam by means of a beam splitter in order to illuminate the processing region of the workpiece, wherein the processing unit is adapted to process the image data of the camera by using the calculated actual relative velocity and the calculated actual relative position between the focal point and the workpiece for compensating a mismatch of position and orientation of a laser processing area in a plurality of image frames.

12. The laser material processing system according to claim 1, wherein the processing unit is adapted to classify the laser processing process on the basis of feature values derived from data from at least one sensor comprising a camera, an air-borne or solid-borne acoustic sensor, or a photo diode sensor for wave length ranges in the infrared, visible and ultraviolet range, wherein the calculated actual velocity is further used for the classification result as a feature value.

13. The laser material processing system according to claim 4, wherein the processing unit is adapted to calculate a mean transitional and/or rotational acceleration on the basis of the acceleration data from the at least two inertial sensors fixed to one optical component of the optical system or the workpiece, or is adapted to calculate a mean transitional and/or rotational acceleration on the basis of the acceleration data from the at least two inertial sensors fixed to a optical component of the optical system and the workpiece, or is adapted to calibrate the at least two inertial sensors at subsequent time points, to reduce the signal-to-noise ratio of the acceleration data.

14. A method for processing a workpiece by means of a laser material processing system according to claim 1, comprising the steps of:
focusing a laser beam in order to form a focal point on the workpiece or in a defined position relative to the workpiece by means of a optical system having at least one optical component,
detecting transitional and/or rotational acceleration of the at least one optical component of the optical system and/or the workpiece by means of at least one inertial sensor,
allocating a real-time timestamp to each sensor data;
calculating an actual velocity and/or an actual relative position between the focal point and the workpiece on the basis of the detected transitional and/or rotational acceleration by integrating over time by using the allocated timestamps and having a respective initial velocity ($v_0$) and/or a respective initial relative position ($x_0$);
determining a relative transitional and/or rotational acceleration between the focal point and the workpiece by means of a processing unit connected to the at least one inertial sensor; and
controlling an actuator system to regulate an actual relative position between the focal point and the workpiece to a set relative position by positioning the at least one optical component and/or the workpiece on the basis of the calculated actual relative position between the focal point and the workpiece.

* * * * *